United States Patent [19]
Kanegae

[11] Patent Number: 5,440,434
[45] Date of Patent: Aug. 8, 1995

[54] REPRODUCED WAVEFORM EQUILIZING CIRCUIT FOR THIN-FILM MAGNETIC HEAD

[75] Inventor: Masahide Kanegae, Kawasaki, Japan

[73] Assignee: Fujitsu Limited, Kawasaki, Japan

[21] Appl. No.: 50,170

[22] PCT Filed: Dec. 25, 1992

[86] PCT No.: PCT/JP92/01694

§ 371 Date: May 3, 1993

§ 102(e) Date: May 3, 1993

[87] PCT Pub. No.: WO93/14493

PCT Pub. Date: Jul. 22, 1992

[30] Foreign Application Priority Data

Jan. 10, 1992 [JP] Japan .................. 4-003064
Mar. 31, 1992 [JP] Japan .................. 4-076445

[51] Int. Cl.⁶ .......................... G11B 5/09; G11B 15/12
[52] U.S. Cl. .......................... 360/65; 360/45
[58] Field of Search .................. 360/51, 46, 45, 65, 360/61, 53

[56] References Cited

U.S. PATENT DOCUMENTS

| | | | |
|---|---|---|---|
| 4,479,152 | 10/1984 | Chi | 360/46 |
| 4,564,869 | 1/1986 | Baumeister | 360/46 |
| 4,580,176 | 4/1986 | Graves et al. | 360/45 |
| 4,633,336 | 12/1986 | Horie et al. | 360/45 |
| 4,757,395 | 7/1988 | Nishikawa et al. | 360/65 X |
| 4,796,109 | 1/1989 | Sordello et al. | 360/45 |
| 4,907,100 | 3/1990 | Nishiyama et al. | 360/45 |
| 4,973,915 | 11/1990 | Batey | 360/65 X |
| 5,008,761 | 4/1991 | Nishiyama et al. | 360/45 |
| 5,103,352 | 4/1992 | Moon et al. | 360/65 |
| 5,163,003 | 11/1992 | Kamura | 360/45 |
| 5,165,089 | 11/1992 | Jaquette et al. | 360/45 X |
| 5,233,481 | 8/1993 | Okamura et al. | 360/45 |
| 5,249,086 | 9/1993 | Sharma | 360/45 |

FOREIGN PATENT DOCUMENTS

| | | | |
|---|---|---|---|
| 0333592 | 9/1989 | European Pat. Off. | 360/65 |
| 61-059664 | 3/1986 | Japan | 360/65 |
| 61-99906 | 5/1986 | Japan | 360/45 |
| 61-139980 | 6/1986 | Japan . | |
| 61-156574 | 7/1986 | Japan | 360/65 |
| 182303 | 3/1989 | Japan | 360/65 |
| 3189904 | 8/1991 | Japan | 360/46 |
| 3201206 | 9/1991 | Japan | 360/46 |
| 3219403 | 9/1991 | Japan | 360/65 |
| 444605 | 2/1992 | Japan | 360/46 |

*Primary Examiner*—Donald Hajec
*Assistant Examiner*—Thien Minh Le
*Attorney, Agent, or Firm*—Greer, Burns & Crain, Ltd.

[57] ABSTRACT

In a reproduced waveform equalizing circuit for thin-film magnetic heads for eliminating a negative edge of a thin-film magnetic head, even if there is a manufactural variation in thin-film magnetic heads, the negative edge is eliminated. In the reproduced waveform equalizing circuit, an operation circuit receives a readout output including a negative edge from a selected one of a plurality of thin-film magnetic heads and performs waveform equalization from the output of a delay circuit. The output delay circuit has an input side terminated with a characteristic impedance and provides a time delay of (τ2−τ1), the output of a multiplier (4) for multiplying a (J2-J1) delayed signal by K1 and the output of a delay amount changing circuit (6) for delaying an input signal to eliminate a negative edge. The waveform equalizing circuit is provided with a delay amount determining circuit for determining a delay time for elimination of a negative edge from a head select signal and a head position signal of the thin-film magnetic head 1, whereby a delay amount of the delay amount changing circuit is controlled by a delay amount indicating signal from the delay amount determining circuit.

15 Claims, 18 Drawing Sheets

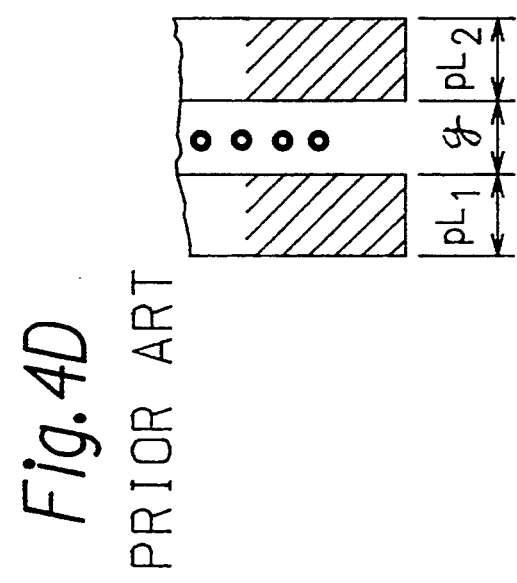
Fig. 4A PRIOR ART
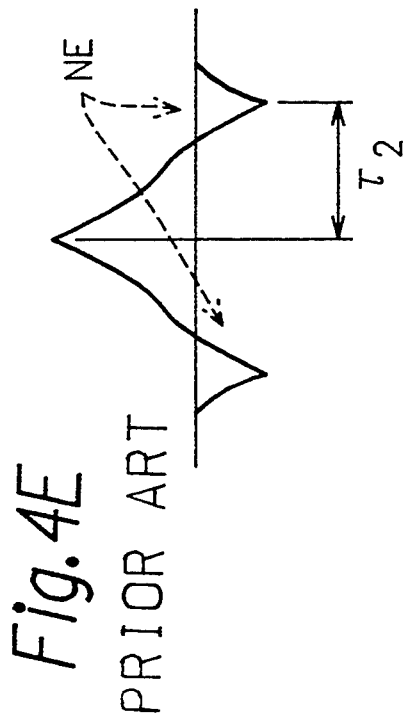
Fig. 4D PRIOR ART
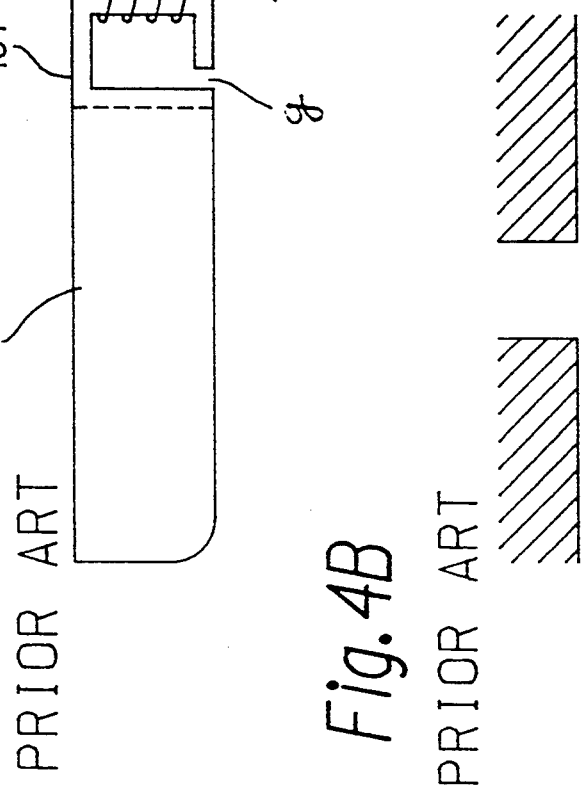
Fig. 4B PRIOR ART
Fig. 4C PRIOR ART
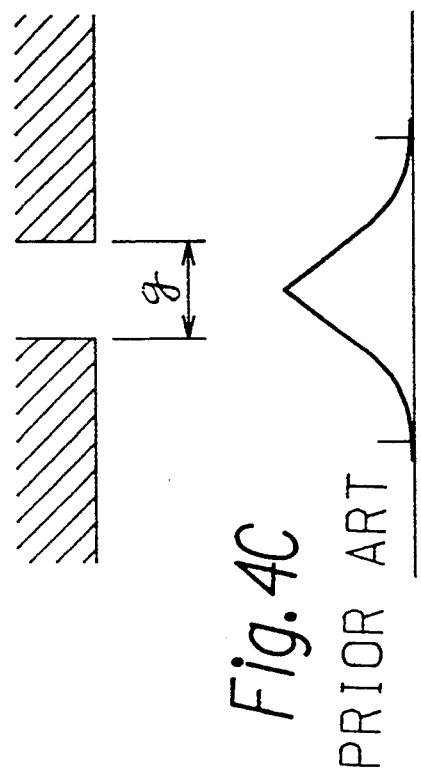
Fig. 4E PRIOR ART

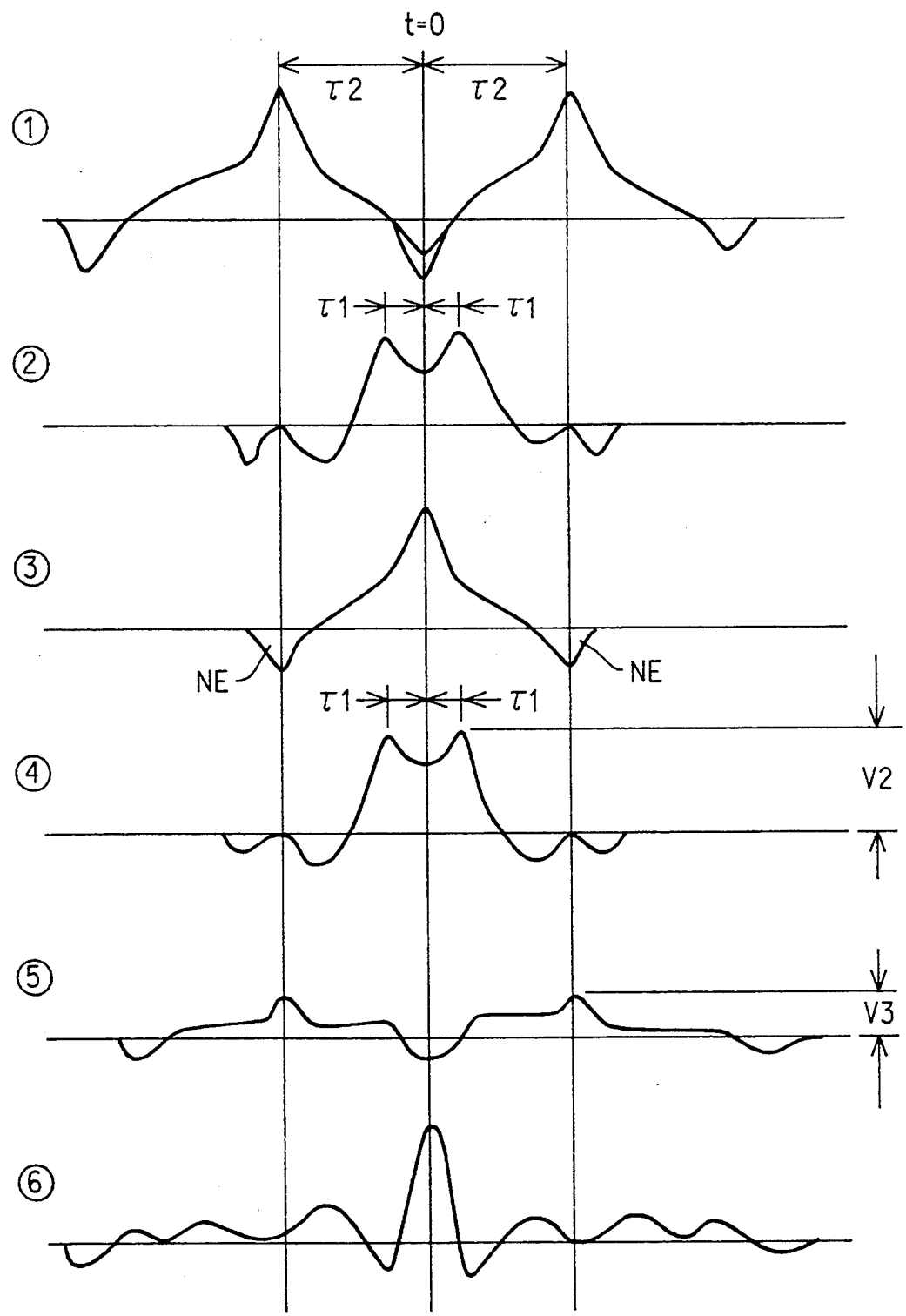

Fig.8
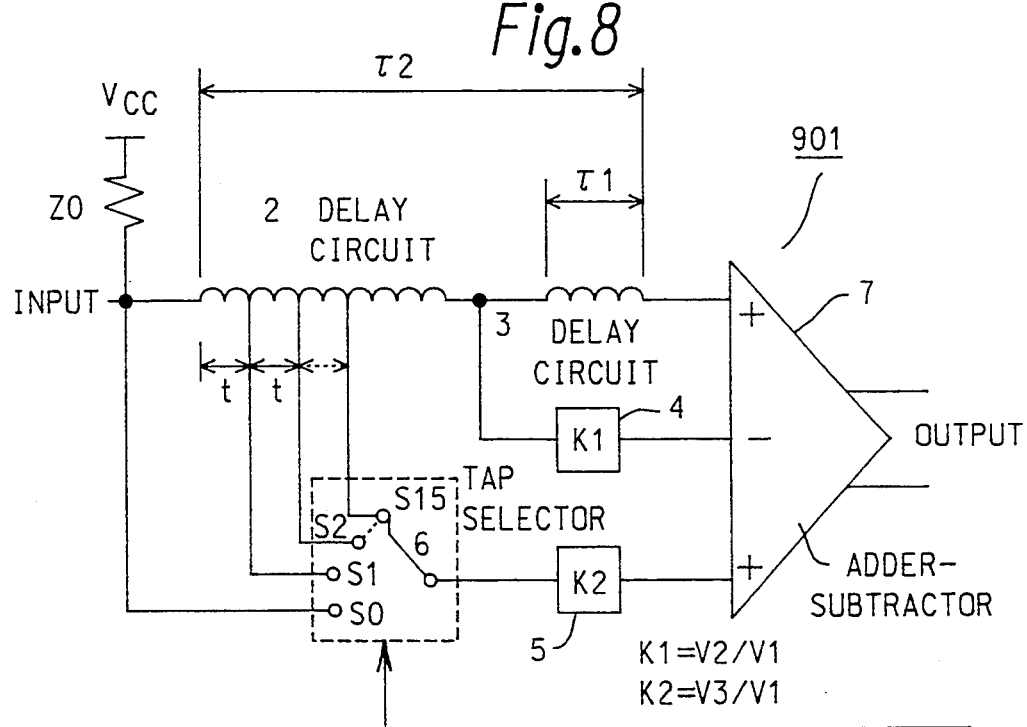
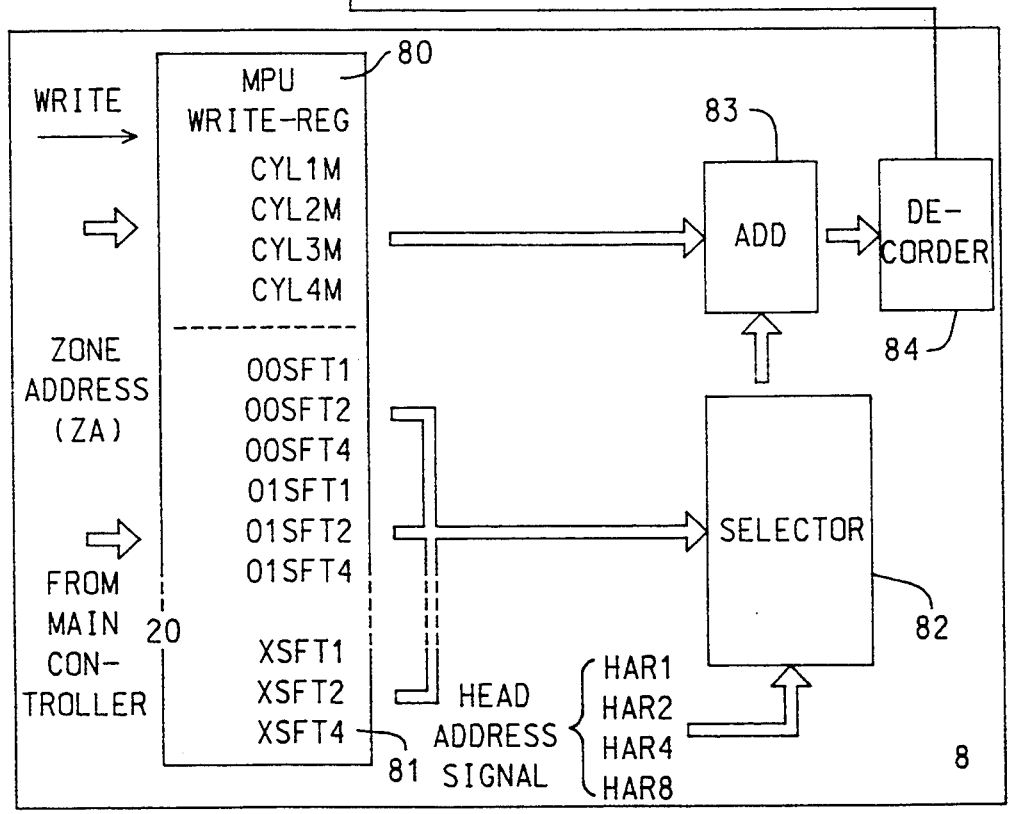

$\tau 2$ = TOTAL DELAY AMOUNT
$t$ = SWITCHING RESOLUTION

Fig.10

| ITEM | VALUE SET IN REGI. | | | DELAY AMOUNT OF DELY LINE IN EACH ZONE | | | | | | | | | |
|---|---|---|---|---|---|---|---|---|---|---|---|---|---|
| | SFT4 | SFT2 | SFT1 | ZONE0 | ZONE1 | ZONE2 | ZONE3 | ZONE4 | ZONE5 | ZONE6 | ZONE7 | ZONE8 | ZONE9 |
| 1 | 0 | 0 | 0 | $\tau 2-9t$ | $\tau 2-8t$ | $\tau 2-7t$ | $\tau 2-6t$ | $\tau 2-5t$ | $\tau 2-4t$ | $\tau 2-3t$ | $\tau 2-2t$ | $\tau 2-t$ | $\tau 2$ |
| 2 | 0 | 0 | 1 | $\tau 2-10t$ | $\tau 2-9t$ | $\tau 2-8t$ | $\tau 2-7t$ | $\tau 2-6t$ | $\tau 2-5t$ | $\tau 2-4t$ | $\tau 2-3t$ | $\tau 2-2t$ | $\tau 2-t$ |
| 3 | 0 | 1 | 0 | $\tau 2-11t$ | $\tau 2-10t$ | $\tau 2-9t$ | $\tau 2-8t$ | $\tau 2-7t$ | $\tau 2-6t$ | $\tau 2-5t$ | $\tau 2-4t$ | $\tau 2-3t$ | $\tau 2-2t$ |
| 4 | 0 | 1 | 1 | $\tau 2-12t$ | $\tau 2-11t$ | $\tau 2-10t$ | $\tau 2-9t$ | $\tau 2-8t$ | $\tau 2-7t$ | $\tau 2-6t$ | $\tau 2-5t$ | $\tau 2-4t$ | $\tau 2-3t$ |
| 5 | 1 | 0 | 0 | $\tau 2-13t$ | $\tau 2-12t$ | $\tau 2-11t$ | $\tau 2-10t$ | $\tau 2-9t$ | $\tau 2-8t$ | $\tau 2-7t$ | $\tau 2-6t$ | $\tau 2-5t$ | $\tau 2-4t$ |
| 6 | 1 | 0 | 1 | $\tau 2-14t$ | $\tau 2-13t$ | $\tau 2-12t$ | $\tau 2-11t$ | $\tau 2-10t$ | $\tau 2-9t$ | $\tau 2-8t$ | $\tau 2-7t$ | $\tau 2-6t$ | $\tau 2-5t$ |
| 7 | 1 | 1 | 0 | $\tau 2-15t$ | $\tau 2-14t$ | $\tau 2-13t$ | $\tau 2-12t$ | $\tau 2-11t$ | $\tau 2-10t$ | $\tau 2-9t$ | $\tau 2-8t$ | $\tau 2-7t$ | $\tau 2-6t$ |
| 8 | 1 | 1 | 1 | $\tau 2-16t$ | $\tau 2-15t$ | $\tau 2-14t$ | $\tau 2-13t$ | $\tau 2-12t$ | $\tau 2-11t$ | $\tau 2-10t$ | $\tau 2-9t$ | $\tau 2-8t$ | $\tau 2-7t$ |

REPRODUCED WAVEFORM EQUILIZING CIRCUIT FOR THIN-FILM MAGNETIC HEAD

TECHNICAL FIELD

The present invention relates to a circuit for improving the waveform of a reproduced signal from a magnetic disk apparatus, and, more particularly, to a waveform equalizing circuit that eliminates the negative peak (negative edge) of the opposite phase, which appears on the signal waveform that is read by a thin-film magnetic head of a magnetic disk apparatus.

BACKGROUND ART

To meet a demand for an improved performance of a magnetic disk apparatus, there have been active developments on technologies to increase the capacity and the data transfer speed.

Among those is the use of a thin-film magnetic head in place of a conventional monolithic type ferrite head as a head which is positioned to face the surface of a rotating magnetic disk to write and read data, thereby easily accomplishing larger capacity and higher data transfer.

That is, the use of a thin-film magnetic head can make the head smaller, reduce the inductance of the winding and increase the resonance frequency, thus narrowing the bit interval.

Therefore, the S/N of the readout signal is improved so that the recording density can be improved, making it possible to easily accomplish a larger capacity.

FIG. 1 is a schematic transverse cross section of a magnetic disk apparatus that uses this thin-film magnetic head.

In FIG. 1, "10" denotes a plurality of magnetic disks provided on a shaft 12 that is rotated by a spindle motor 11. Sliders 15 having thin-film magnetic heads 1 at their end are arranged to face the top and back surfaces of the magnetic disks 10.

Each slider 15 is attached to a spring arm 17 by a gimbal 16, and the spring arm 17 is coupled to a voice coil motor 19 via a drive arm 18.

Therefore, each thin-film magnetic head 1 is moved in the radial direction of the associated magnetic disk 10 by the voice coil motor 19 to seek the cylinder position to be accessed.

FIG. 2 is an enlarged view of the thin-film magnetic head provided at the end of the slider 15 that is supported by the gimbal 16. As shown in FIG. 2(A), the thin-film magnetic head 1 faces the magnetic disk 10 and is provided at the end of the slider 15, which has an air receiving face 151.

FIG. 2(B) presents an enlarged illustration of the thin-film magnetic head 1 provided at the end of the slider 15. The thin-film magnetic heads 1 comprise yokes 101 and coils 102. The feature lies in that those are formed by an IC process to have a thickness on the order of several microns.

The technology of designing the thin-film magnetic heads formed by this IC process is described on pages 353 to 364 in the magazine "FUJITSU Sci. Tech. J., (February 1991)."

FIG. 3 is a schematic transverse cross-sectional view as viewed from the direction of the write/read gap g (FIG. 2(B)) defined between a pair of magnetic poles (poles) of the yoke 101 of the thin-film magnetic head 1.

As shown in FIG. 3(A), the coil 102 runs through between a lower pole 103 and an upper pole 104 located at the end of the slider 15.

FIG. 3(B) further presents an enlarged illustration of the write/read gap g that is defined by the lower pole 103 and upper pole 104 facing each other.

While this thin-film magnetic head 1 can increase the track density of a magnetic disk apparatus as described earlier, it produces a peculiar negative edge.

FIG. 4 is a diagram for explaining this negative edge while comparing the gap portion g of the thin-film magnetic head 1 in FIG. 3(B) with that of the conventional monolithic type ferrite head.

As shown in FIG. 4(A), the conventional ferrite head 1 comprises a yoke 101 at the end of a slider 15 and a coil 102 wound around the yoke.

This ferrite head has a pole-face length (pole length) on the order of millimeters as shown in an enlarged view of the gap portion g in FIG. 4(B). This pole length can be considered as substantially infinite, compared with the gap distance g between the magnetic poles, so that a negative edge will not appear on the reproduced waveform (see the reproduced waveform in FIG. 4(C)).

FIG. 4(D) is an enlarged view of the gap portion g of the thin-film magnetic head 1. The pole-face length (pole length) pl 1 and pl 2, unlike that of the ferrite head (FIG. 4(B)), are on the order of microns. Therefore, the pole-face lengths pl 1 and pl 2 should be considered as finite in comparison with the gap length g.

As the pole length pl of the thin-film magnetic head 1 is finite, a negative edge or a negative peak of the opposite phase to that of the main peak (see the NE portions of the reproduced waveform in FIG. 4(E)) occurs at positions corresponding to the outer edge portions of the poles.

This negative edge becomes a peculiar pulse (extra pulse) in the reproduced signal from a magnetic medium or reduces the signal peak (level down) in accordance with a change in the interval between reversals of magnetization, thus increasing the data read error.

As the circumferential speed of the magnetic disk differs depending on the cylinder position (the position in the radial direction of the magnetic disk 10), the time length π 2 of the negative edge from the position of the normal signal peak varies. Thus, the influence of the negative edge on the reproduced signal varies also in accordance with the cylinder position.

In this respect, there is a demand for a reproduced waveform equalizing technology to effectively eliminate the negative edge peculiar to the thin-film magnetic head 1.

DISCLOSURE OF THE INVENTION

It is therefore an object of the present invention to provide a reproduced waveform equalizing circuit for thin-film magnetic heads, which can eliminate a negative edge.

It is another object of the present invention to provide a reproduced waveform equalizing circuit for thin-film magnetic heads, which can eliminate a negative edge even if there is a manufactural variation in thin-film magnetic heads.

It is a still another object of the present invention to provide a reproduced waveform equalizing circuit which can eliminate a negative edge even if the position of the negative edge shifts depending on the seek position of a thin-film magnetic head and due to a manufactural variation in thin-film magnetic heads.

It is a further object of the present invention to provide a method of controlling a reproduced waveform equalizing circuit for thin-film magnetic heads, which method can easily and accurately control a waveform equalizing circuit capable of eliminating a negative edge even if there is a manufacture related variation in thin-film magnetic heads.

The present invention aims provides a reproduced waveform equalizing circuit for thin-film magnetic heads, which comprises a delay circuit for delaying a readout signal, read by a thin-film magnetic head selected by a head select signal, by a predetermined time; a delay amount changing circuit for giving the readout signal a delay time shorter than a delay time given by the delay circuit; an operation circuit, functionally connected to the delay circuit and delay amount changing circuit, for outputting a waveform-equalized signal acquired by eliminating a negative edge of the readout signal from a first delay signal delayed by the predetermined time and a second delay signal delayed by a time shorter than the predetermined time; and a delay amount determining circuit for determining a delay time given by the delay amount changing circuit from the head select signal and a head position signal the thin-film magnetic head, whereby a delay amount of the delay amount changing circuit is controlled by a delay amount indicating signal from the delay amount determining circuit.

BRIEF DESCRIPTION OF THE DRAWINGS

FIG. 4 is a diagram illustrating a ferrite head in comparison with a thin-film magnetic hoad;

FIG. 6 presents a waveform diagram for explaining the operation of the prior art;

FIG. 8 is a block diagram showing one embodiment of the essential portion of a waveform equalizing circuit 9 shown in FIG. 7;

FIG. 10 presents a diagram for explaining the operation of the circuit in FIG. 8;

BEST MODE OF CARRYING OUT THE INVENTION (a) Description of the Previously Proposed Reproduced Waveform Equalizing Circuit For better understanding of the present invention, a reproduced waveform equalizing circuit proposed in an earlier patent application filed by the present applicant (the assignee of the present invention) will be described before the description of embodiments.

The invention of the earlier patent application is described in Japanese Unexamined Patent Publication No. Tokukai sho 61-139980. A brief description of that invention will be given in conjunction with FIGS. 5 and 6.

Figure 5A:
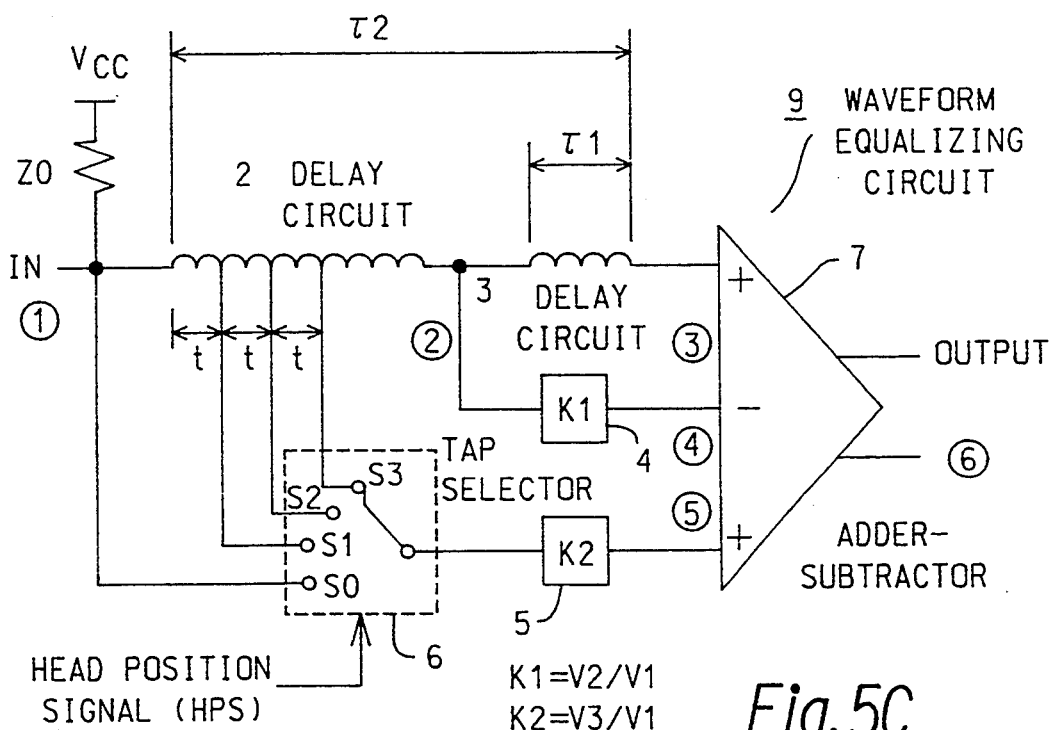
FIG. 5 is an explanatory diagram of a prior art.

FIG. 5(A) presents a block diagram of the reproduced waveform equalizing circuit proposed earlier.

A cosine equalizer is constituted of concatenated delay circuits 2 and 3 with an input terminal IN 1 terminated with a characteristic impedance $Z_0$, a multiplier 4 for multiplying the output of the delay circuit 2 (the input signal delayed by a time $(\tau2-\tau1)$ by K1 (V2/V1), and an adder-subtracter 7. This equalizer further includes a tap selector 6 for selecting individual taps S0 to S1 of the delay circuit in accordance with a head position signal HPS, and a negative edge eliminating circuit which multiplies the output of the tap selector 6 by K2 (V3/V1) and inputs the result to the adder-subtracter 7.

In the operation of this circuit, the readout output (peak V1) of a thin-film magnetic head 1 is input as an input IN1, as shown in FIG. 6. Thus, the output of the delay circuit 3 becomes a signal 3 which is the input signal IN 1 delayed by a time $\tau2$.

Provided that the end of the delay circuit 3 has, for example, an emitter follower arrangement in the adder-subtracter 7 to have an impedance as high as infinity, then it is an open end, so that the output of the delay circuit 2 is reflected at the end of the delay circuit 3.

Thus, the signal at the output end of the delay circuit 2 is the sum of the input signal delayed by $(\tau2-\tau1)$ and the reflected, $(\tau2+\tau1)$-delayed signal, as shown in 2 in FIG. 6. Multiplying this signal by K1 in the multiplier 4 yields a signal of 4 in FIG. 6 that has a peak of V2.

Subtracting the signal of 4 from the signal of 3 to slim the waveform of 3 yields a signal having a sharp peak like 6. Therefore, the adder-subtracter 7 serves as a cosine equalizer.

But, the negative edge NE has not been eliminated yet as shown in 3 in FIG. 6. To eliminate this negative edge, therefore, a signal having a predetermined delay amount is selected by the tap selector 6 and is multiplied by K2 by the multiplier 5.

Thus, the output of the multiplier 5 becomes a signal with a peak V3 shown in 5, and further adding this signal in the adder-subtracter 7 yields a signal (equalized signal) with a sharp peak from which a negative edge has been eliminated as shown in 6.

By slimming the isolated reproduced waveform and eliminating a negative edge, waveform interference to the adjacent bit is reduced, thereby accomplishing the reduction of the peak shift and an improvement on the signal amplitude.

The following is the reason why a signal having a predetermined delay amount is selected by the tap selector 6 as mentioned above.

Figure 5B:
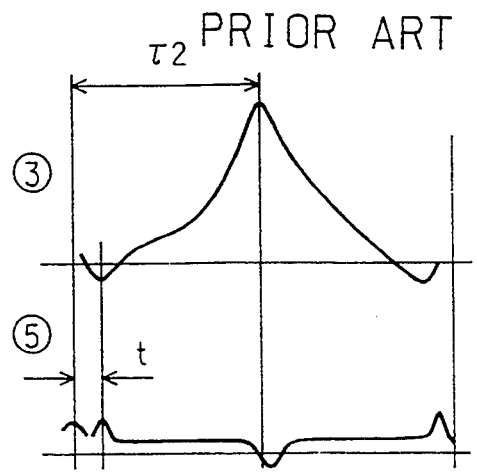
Figure 5C:
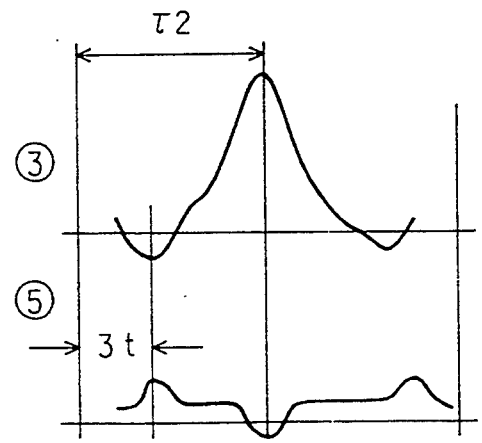

Ckiser ti tge iytusde track of a magnetic disk, the faster the circumferential speed becomes and the shorter the interval between reproduced waveforms becomes, as shown in FIG. 5(C).

On the other hand, closer to the inside track, the faster the circumferential speed is and the longer the interval between reproduced waveforms becomes, as shown in FIG. 5(B). Therefore, the position of the negative edge changes, so that a delay amount (tap) is selected by the tap selector 6 in accordance with the head position to alter a delay amount for elimination of the negative edge.

But, this technology alone raises the following problems and is insufficient to eliminate the negative edge.

First, as the pole length pl and the gap length g of the thin-film magnetic head 1 are on the order of microns, there may be manufacture related variation. This varies the position of the occurrence of a negative edge depending on heads, thus causing a read error.

Further, as the recording density increases, this variation cannot be neglected, so that tap switching based only on the head position signal common to all the heads will result in insufficient compensation for a negative edge.

(b) Description of Waveform Equalizing Circuit of This Invention

Figure 7:
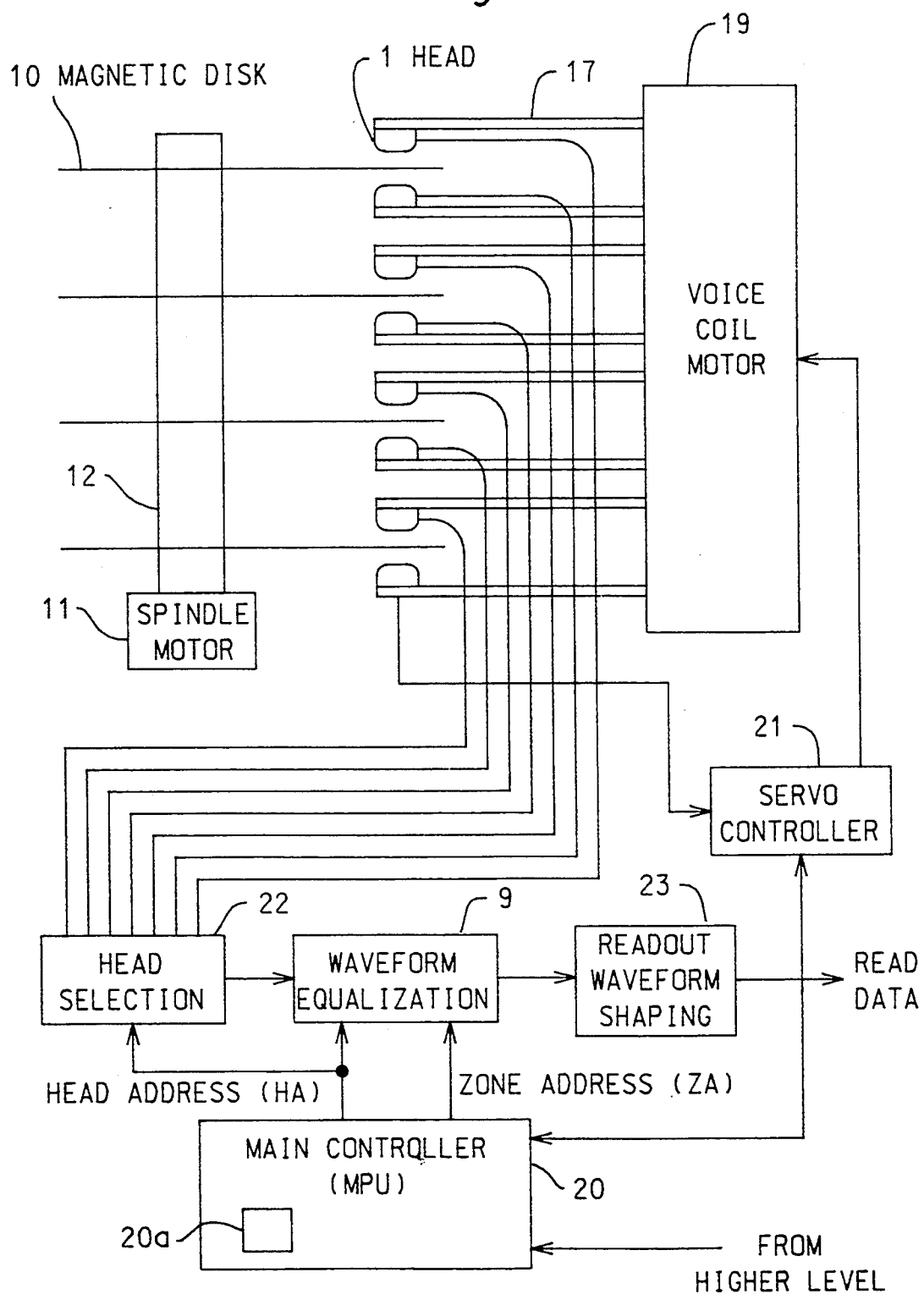
FIG. 7 presents a block diagram of one embodiment of a magnetic disk apparatus embodying the present invention.

FIG. 7 is a block diagram of the general structure of one embodiment of the present invention which overcomes the problems such a conventionally proposed waveform equalizing circuit still has.

Figure 1:
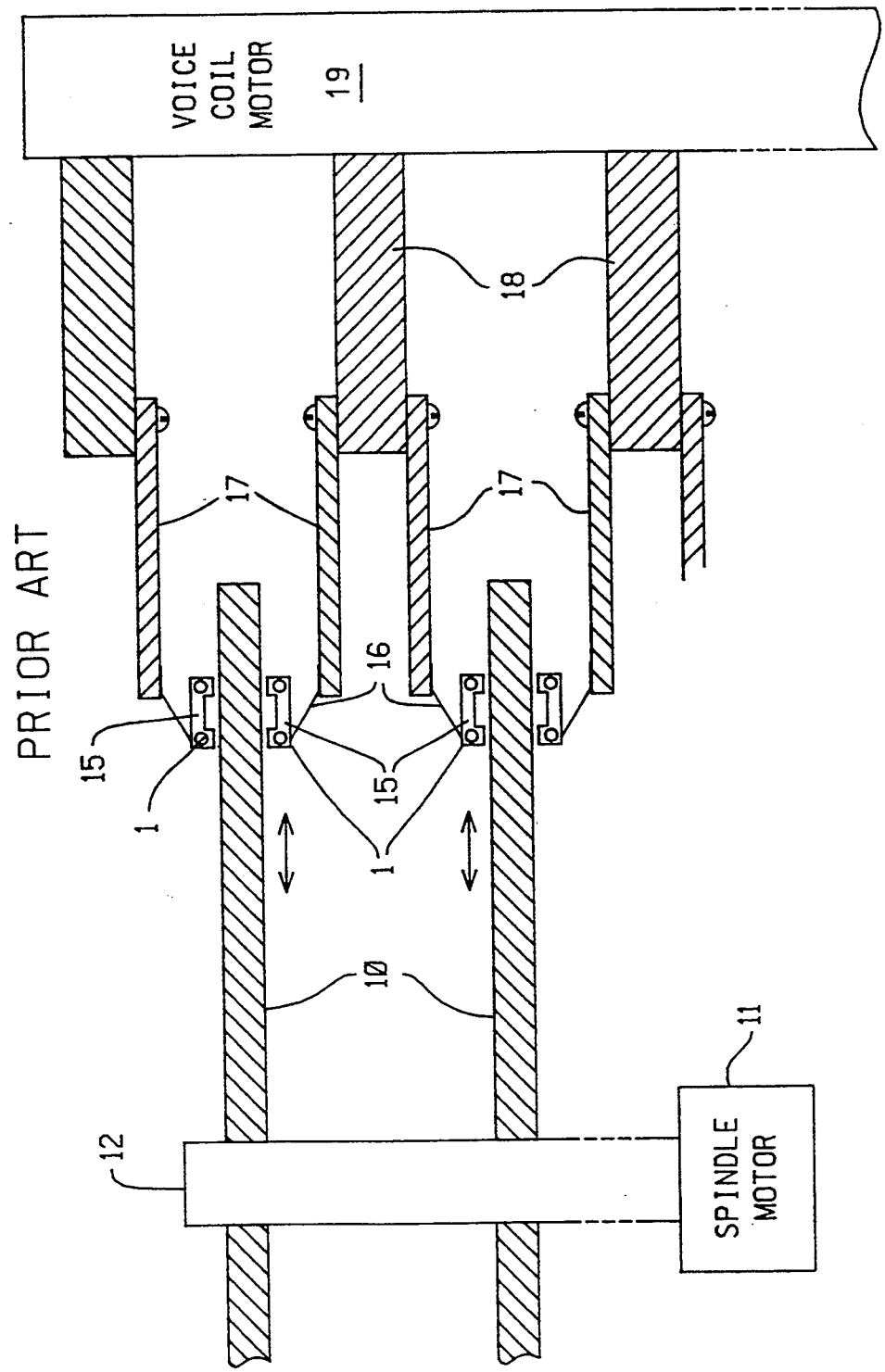
FIG. 1 is a schematic transverse cross section of a magnetic disk apparatus which uses thin-film magnetic heads.
Figure 2A:
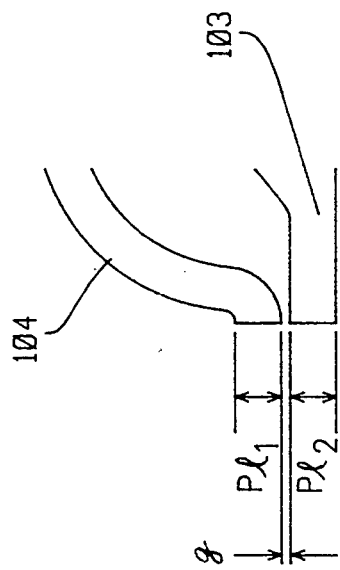
FIG. 2 is an enlarged view of the thin-film magnetic head.
Figure 3B:
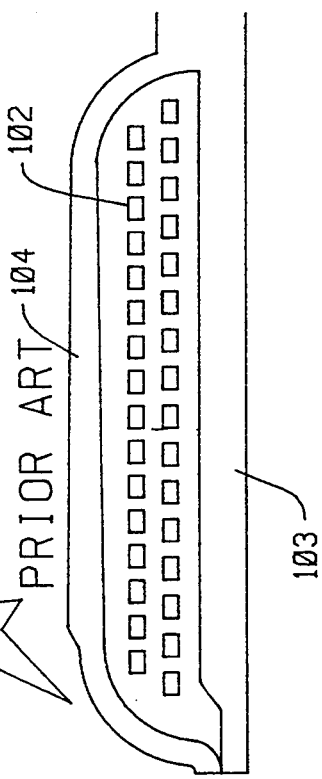
FIG. 3 is an enlarged view of a gap portion of the thin-film magnetic head.
Figure 2B:
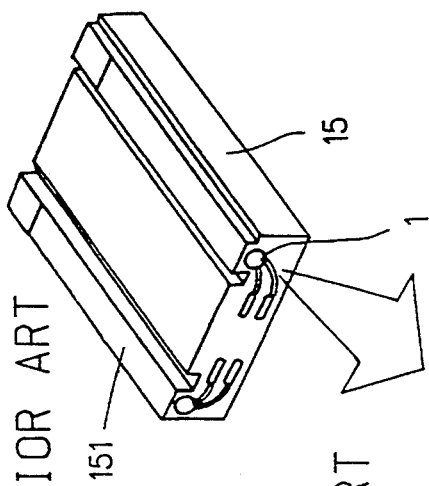
Figure 3A:
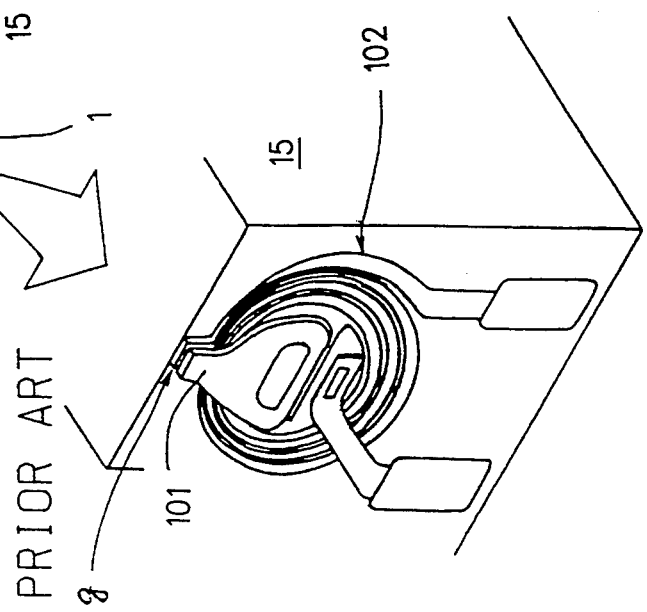

In the diagram, like or same symbols are used to denote parts identical or similar to those shown in FIGS. 1 and 5.

"10" denotes a plurality of magnetic disks which are provided on a shaft 12 of a spindle motor 11, and are rotated with the rotation of the spindle motor 11.

"19" denotes a voice coil motor which allows thin-film magnetic heads 1, supported on spring arms 17, to perform a seek operation in the radial direction of the magnetic disks 10.

"20" is a main controller, which is constituted of a microprocessor (MPU) and performs seek control, write/read control and so forth in accordance with an instruction from a higher-level controller (magnetic disk controller), not shown.

"21" is a servo controller which receives a move instruction including the amount of displacement of the head 1 to a target cylinder, from the main controller 20. Based on this move instruction, it prepares a moving speed instruction.

Then, this servo controller detects the real speed from servo information read from the servo disk area on the magnetic disk 10 by the thin-film magnetic head 1, and controls the speed of the voice coil motor 19 in such a way as to reduce the difference between the instructed moving speed and the real speed. Further, positioning control is performed in the vicinity of the target cylinder based on that servo information.

"22" is a head selector that selects a readout output, which is read out from each thin-film magnetic head 1 via a preamplifier and an AGC circuit (both not shown), by a head address (HA) from the main controller 20.

The head address (HA) specifies one of a plurality of thin-film magnetic heads 1.

"9" designates a waveform equalizing circuit which performs waveform equalization on the selected readout output based on the head address (HA) and a zone address (ZA).

The zone address (ZA) specifies one of a plurality of areas (zones) sectioned in the radial direction of the thin-film magnetic head 1.

"23" is a readout waveform shaping circuit which performs a process, such as differentiation, on the waveform-equalized readout signal to shape it into a readout pulse.

"20a" is a ROM which is provided in the main controller 20 and in which shift data SFT1, SFT2 and SFT4 (to be described later) of the individual thin-film magnetic heads 1 are stored.

FIG. 8 illustrates the structure of an equalizing unit 90 that is the essential portion of the waveform equalizing circuit 9. The waveform equalizing circuit 9 has an AGC amplifier 91 connected to the input side of the equalizing unit 90 and a low-pass filter 92 connected to the output side thereof to thereby constitute an AGC circuit, as will be described again later with reference to FIG. 13.

In FIG. 8, the equalizing unit 90 has an equalizer 901, which has the same structure as the previously-proposed waveform equalizing circuit 9 that has been described with reference to FIG. 5(A) and comprises a cosine equalizer portion and the tap selector 6, and a delay amount determining circuit 8.

The feature of this embodiment of the present invention lies in that the selective switching of the tap selector 6 of the equalizer 901 is executed by the delay amount determining circuit 8.

The tap selector 6 is practically a delay amount changing circuit and is so designed as to be able to select 16 taps, an input end S0 and tap outputs S1 to S15 of a delay circuit 2, which have a time shift of t therebetween.

Figure 11:
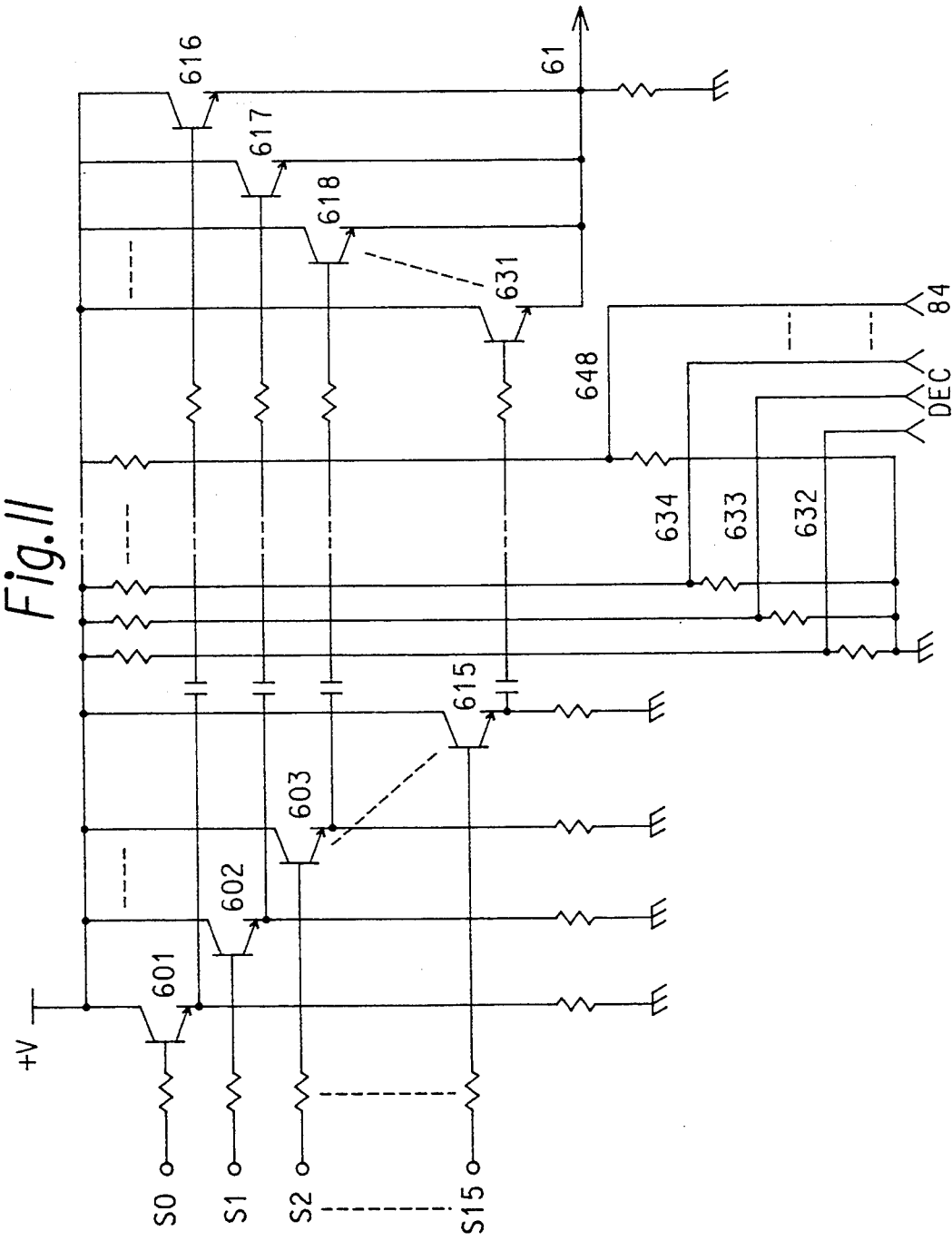
FIG. 11 illustrates one embodiment of a tap selector 6 in FIG. 8.

That is, there are 16 delay amounts T, 0, t, 2t, . . . , 15t, selectable by the tap selector 6. The tap selector 6 is constituted of a circuit as shown in FIG. 11, for example. In FIG. 11, the taps S0 to S15 of the delay circuit 2 are respectively input to the bases of 16 transistors 601 to 615.

The individual transistors 601 to 615 have an emitter follower arrangement and the outputs from their emitters are input to the bases of another 16 transistors 616 to 631. The transistors 616 to 631 have their emitters connected together and likewise have an emitter follower arrangement.

The common emitter 61 is further input to a multiplier in FIG. 8. The potentials of the bases of the transistors 616 to 631 are respectively controlled by outputs 632 to 648 from a decoder 84. In other words, Only one of the transistors 616 to 631 is rendered conductive in accordance with the outputs 632 to 648 from the decoder 84. Therefore, the signal of that tap of the delay circuit 2 which is connected to that one of the transistors 601 to 615 which has the emitter connected to the base of the conducting transistor is output to the emitter 61. The delay amount determining circuit 8 has a zone register 80 and a shift register 81. Written in the zone register 80 is a 4-bit zone address (ZA), CYL1M, CYL2M, CYL3M and CYL4M, (see FIG. 9(B)) which the main controller 20 has acquired from the cylinder address sent from a higher-level device and to which the cylinder address belongs.

Shift data SFT1, SFT2 and SFT4 of 3 bits for the individual thin-film magnetic heads 1 stored in the ROM 20a are written in the shift register 81 by the main controller 20 when power is given.

Further provided is a multiplexer 82 that outputs the 3-bit shift data SFT1, SFT2, SFT4 of the associated thin-film magnetic head 1, which has been written in the shift register 81 at the power ON time, in accordance with a 4-bit head address (HA), HAR1, HAR2, HAR4 and HAR8, from the main controller 20. The zone address CYL1M, CYL2M, CYL3M, CYL4M from the zone register 80 and the shift data SFT1, SFT2, SFT4 from the multiplexer 82 are added by an adder 83. The output of the adder 83 is decoded by the decoder 84 to be a control signal which selectively switches the selected tap of the tap selector 6.

The operation of this circuit will be described below. The relationship between the position of the occurrence of a negative edge specific to each thin-film magnetic head 1 and the cylinder position is expressed by the following equation.

$$Tn = (60/M) \times [(PL + GL/2 + a)/2\pi R]$$

where Tn is the time the negative edge has occurred, M is the number of rotations (rpm) of the spindle motor, PL is the pole length of the thin-film magnetic head, GL is the gap length of the thin-film magnetic head, R is the radius corresponding to the cylinder position, and $\alpha$ is an extra time given because of the occurrence of the negative edge on slightly the outside of the pole end.

Figure 9A:
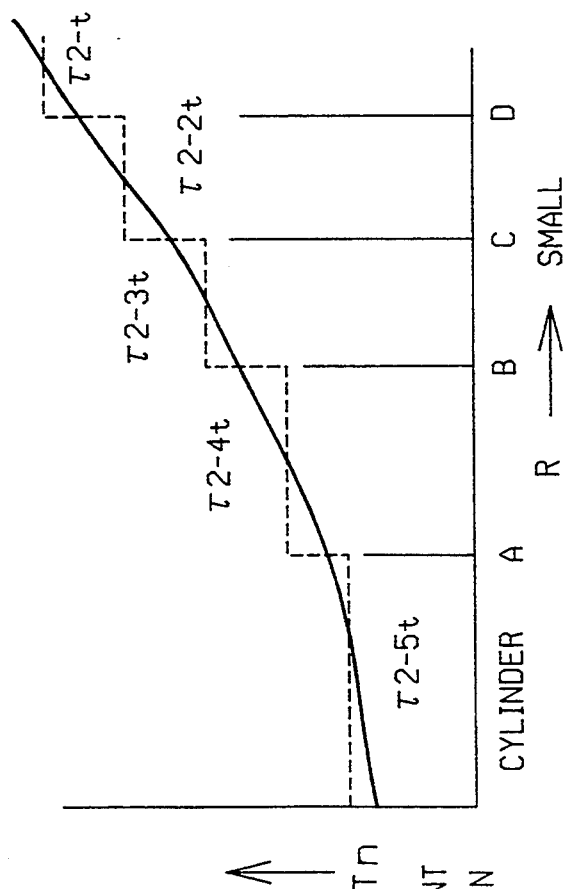
FIG. 9 presents a time chart for explaining the operation of the circuit in FIG. 8.

The relation in this equation, when illustrated, becomes the solid line in FIG. 9(A). If the total delay amount of the delay circuit 2 used in the waveform equalizing circuit 9 and the switching resolution are found from this relation, the optimal delay amount in a certain area of a cylinder is determined.

As the delay amount of the delay circuit 2 cannot be changed linearly, it will be switched stepwise as indicated by the broken line in FIG. 9(A). If the switching resolution is a constant, therefore, the smaller R is, the smaller the coverable range (called "zone") of the cylinder becomes.

Even when the pole length of the thin-film magnetic head 1 changes, the relation of FIG. 9(A) takes a similar form with a simple change in the absolute value of the time of the occurrence of the negative edge, so that the graph merely moves up and down.

Because of the above, the switching cylinders (A, B, C and D in FIG.(A)) for the delay amount of the delay circuit 2 can be made the same so that the position of the switching cylinder can be set irrespective of the characteristics of the thin-film magnetic heads.

It is therefore possible to cope with a change in the pole length of the thin-film magnetic head 1 by shifting the tap of the delay circuit that is selected in each zone, and basically, with the cylinder position as a reference, this has only to be shifted in accordance with the characteristic of each thin-film magnetic head 1.

Figure 9B:
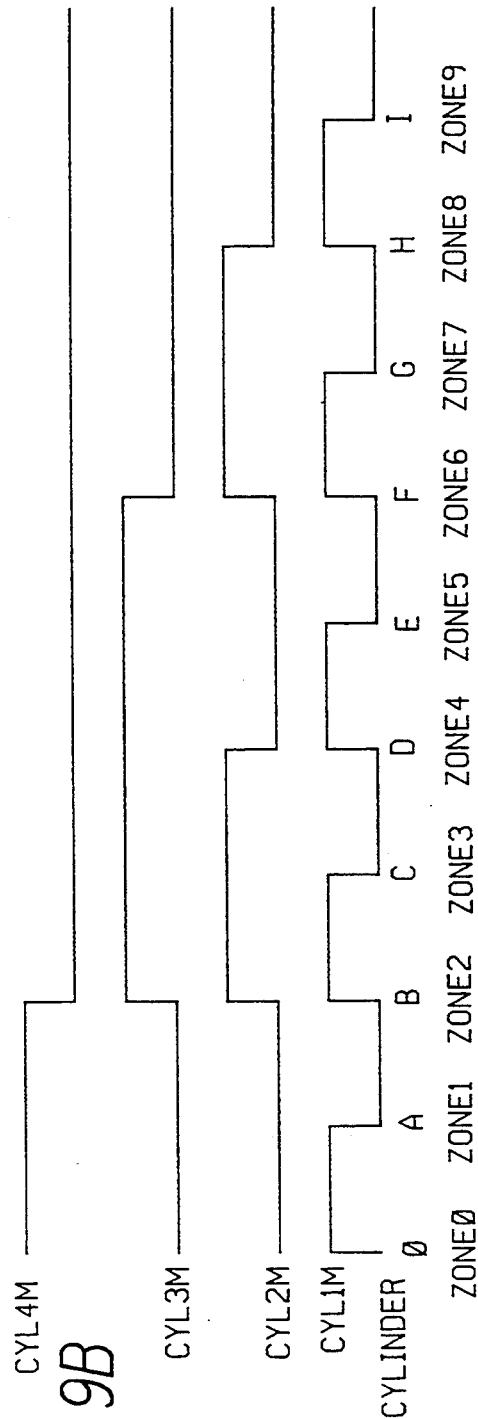

Thus, the total number (e.g., 3000) of tracks on the magnetic disk 10 are divided into zones 0 to 9 from the outer periphery of the magnetic disk 10 as shown in FIG. 9(B) in accordance with the characteristic given in FIG. 9(A), and those zones are expressed by the 4-bit zone address CYL1M to CYL4M.

The main controller 20 is provided with a correlation table showing the relationship between the individual cylinder positions and the zone addresses CYL1M-CYL4M, and that zone address CYL1M-CYL4M which corresponds to the cylinder position specified by the higher-level device is obtained from the table to be written in the zone register 80.

The delay amounts corresponding to the ten zones 0 to 9 associated with combinations of the 4-bit zone address CYL1M to CYL4M are set to range, for example, from $\tau 2 - 9t$ to $\tau 2$ as indicated in the row in which the set value of the register 81 is "000" as shown in FIG. 10.

Thus, a change in the absolute value of the time of the occurrence of the negative edge due to a change in the pole length of each thin-film magnetic head 1 is measured by a measuring method to be described later, and the 3-bit shift data SFT1, SFT2, SFT4 is set in accordance with the amount of the change and is stored in the ROM 20a.

The shift data stored in the ROM 20a is read out and set in the shift register 81 by the main controller at the power ON time.

Upon reception of a read command from the higher-level device, the main controller 20 sends a command to seek the cylinder position, which is included in that read command, to the servo controller 21.

At the same time, the main controller 20 obtains the zone address (ZA) CYL1M-CYL4M from the cylinder position referring to the table, and writes it to the zone register 80 of the delay amount determining circuit 8. Further, the main controller 20 sends the head address (HA) to the head selector 22 (FIG. 7) and to the multiplexer 82 of the delay amount determining circuit 8.

Accordingly, the voice coil motor 19 positions the thin-film magnetic head 1 to the designated cylinder position and the head selector 22 selects the designated thin-film magnetic head 1.

The shift data SFT1, SFT2, SFT4 of the designated thin-film magnetic head 1 is selected by the multiplexer 82 and is added in the adder 83 to the zone address CYL1M-CYL4M of the register 80. The decoder 84 decodes the output of the adder 83 to control the tap position of the tap selector 6.

For instance, when the zone address CYL1M-CYL4M indicates the zone 8 and the shift data STF1, 2, 4 of the thin-film magnetic head 1 is "100," the delay amount becomes $\tau 2 - 2t$ as shown in FIG. 10. Thus, the output of the decoder 84 becomes a tap select signal that causes the tap selector 6 to select the tap $2.

As shown in the above-described FIG. 6, therefore, when the readout output (peak V1) of the thin-film magnetic head 1 is input as the input1, the output of the delay circuit 3 becomes a signal 3 which is the input signal delayed by a time $\tau 2$. Provided that the end of the delay circuit 3 has, for example, an emitter follower arrangement to have an impedance as high as infinity, then it is an open end, so that the output of the delay circuit 2 is reflected at the end of the delay circuit 3 to become the sum of the input signal delayed by $(\tau 2 - \tau 1)$ and the reflected, $(\tau 2 + \tau 1)$-delayed signal, like 2. Multiplying this signal by K1 in the multiplier 4 yields a signal of 4 with a peak of V2.

Subtracting the signal of 4 from the signal of 3 to slim the waveform of 3 yields a signal having a sharp peak like 6. To eliminate the negative edge, the input signal is given a delay amount selected by the tap selector 6 and the result is multiplied by K2 by the multiplier 5, yielding a signal with a peak V3 shown in 5. Further adding this signal in the adder-subtracter 7 yields a signal (equalized signal) with a sharp peak from which the negative edge has been eliminated as shown in 6.

The adder-subtracter 7 having the above-described adding-subtracting function can be constituted by, for example, cascade connection of differential amplifiers of the same structure in two stages.

The negative edge can be eliminated by the delay amount that is associated with the cylinder position of the designated thin-film magnetic head 1 and the characteristic of the negative edge.

It is therefore possible to accomplish readout waveform equalization which effectively eliminates a negative edge o specific to the thin-film magnetic head irrespective of the characteristic of the thin-film magnetic head 1.

As the delay amount corresponding to the characteristic of the thin-film magnetic head 1 is adjusted as a shift amount, with the delay amount dependent on the cylinder position taken as a reference in this embodiment, a smaller memory capacity is needed.

Further, as the selection is made by hardware of the multiplexer 82, the delay amount can be selected at a speed corresponding to the high-speed head switch.

Furthermore, as the delay amount is made variable using the tap output of the delay circuit 2, the structure becomes simpler.

Figure 12:
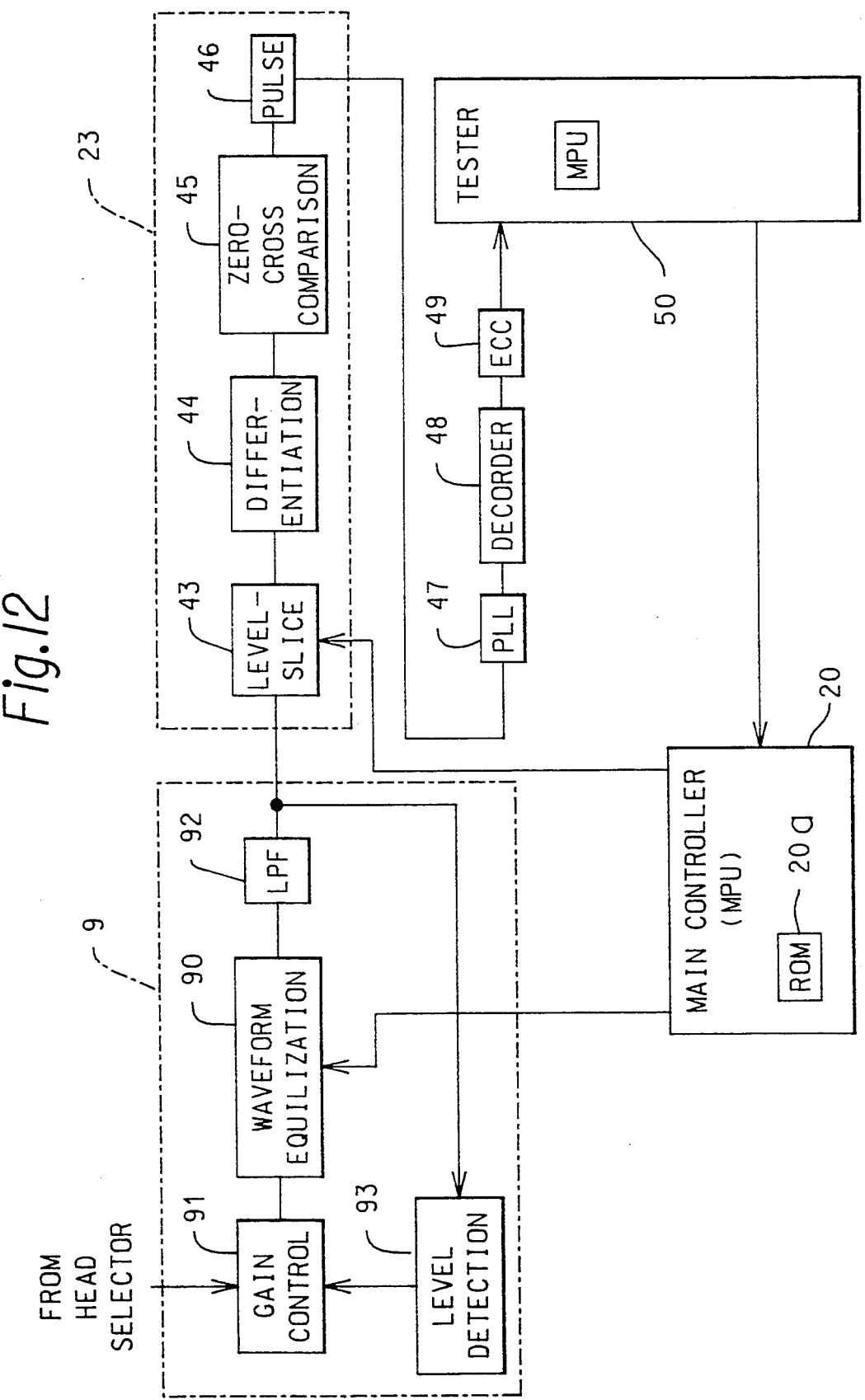
FIG. 12 is a block diagram of one embodiment for determining a control delay amount for each magnetic head.

(b) Description of Method of Determining Shift Data (SFTI-BFT4) of Thin-film Magnetic Head FIG. 12 is a block diagram of an embodiment for determining a delay amount associated with the characteristic of each magnetic head 1.

In FIG. 12, the main controller 20, waveform equalizing circuit 9 and readout waveform shaping circuit 23 constitute a reproduced waveform equalizing circuit to which the present invention is directed. Normally, a magnetic disk apparatus supplies the output of the readout waveform shaping circuit 23 to a phase lock loop (PLL 47), decodes the result with a given number of bits (decoder 48), and then performs an error check on its output (ECC 49) to output it as data. Thus, FIG. 12 shows the structure of the ordinary magnetic disk apparatus further equipped with a tester 50.

The waveform equalizing circuit 9 comprises an AGC amplifier 91, an equalizing unit 90, a low-pass filter 92 and a level detector 93 that serves as a negative feedback circuit, thus constituting an AGC control circuit.

The AGC amplifier 91 controls the gain of the readout signal from the head selector 22 to a constant level based on the output of the level detector 93.

"92" is a low-pass filter which passes the low-frequency component of the equalized signal from the equalizing circuit 90. "93" is a level detector which detects the output level of the low-pass filter 92 to control the gain of the AGC amplifier 91.

The output of the low-pass filter 92 is input to the readout waveform shaping circuit 23 (see FIG. 7). The readout waveform shaping circuit 23 has a level slicer 43, a differentiator 44, a zero-cross comparator 45 and a pulse circuit 46.

The level slicer 43 slices the output of the low-pass filter 92 at a slice level set by the controller 20 to make it into a pulse. The differentiator 44 differentiates the output of the level slicer 43. The zero-cross comparator 45 detects the zero-crossing point of the output of the differentiator 44.

Further, "46" is a pulse circuit that makes the zero-cross output into a pulse.

"47" is a PLL circuit which receives the output of the pulse circuit 46 and generates a PLL signal that is phaseo locked with that output. "48" is a decoder which decodes a predetermined number of bits of the phase-locked output of the pulse circuit 46 for serial/parallel conversion. Further, "49" is an ECC circuit which performs error detection and correction.

"50" is a tester, which has a built-in microprocessor and generates instruction data to the main controller 20 to monitor the output of the ECC circuit 49. It also sends an instruction to the main controller 20 to determine a control value for the delay amount in a control process to be described later.

Figure 13:
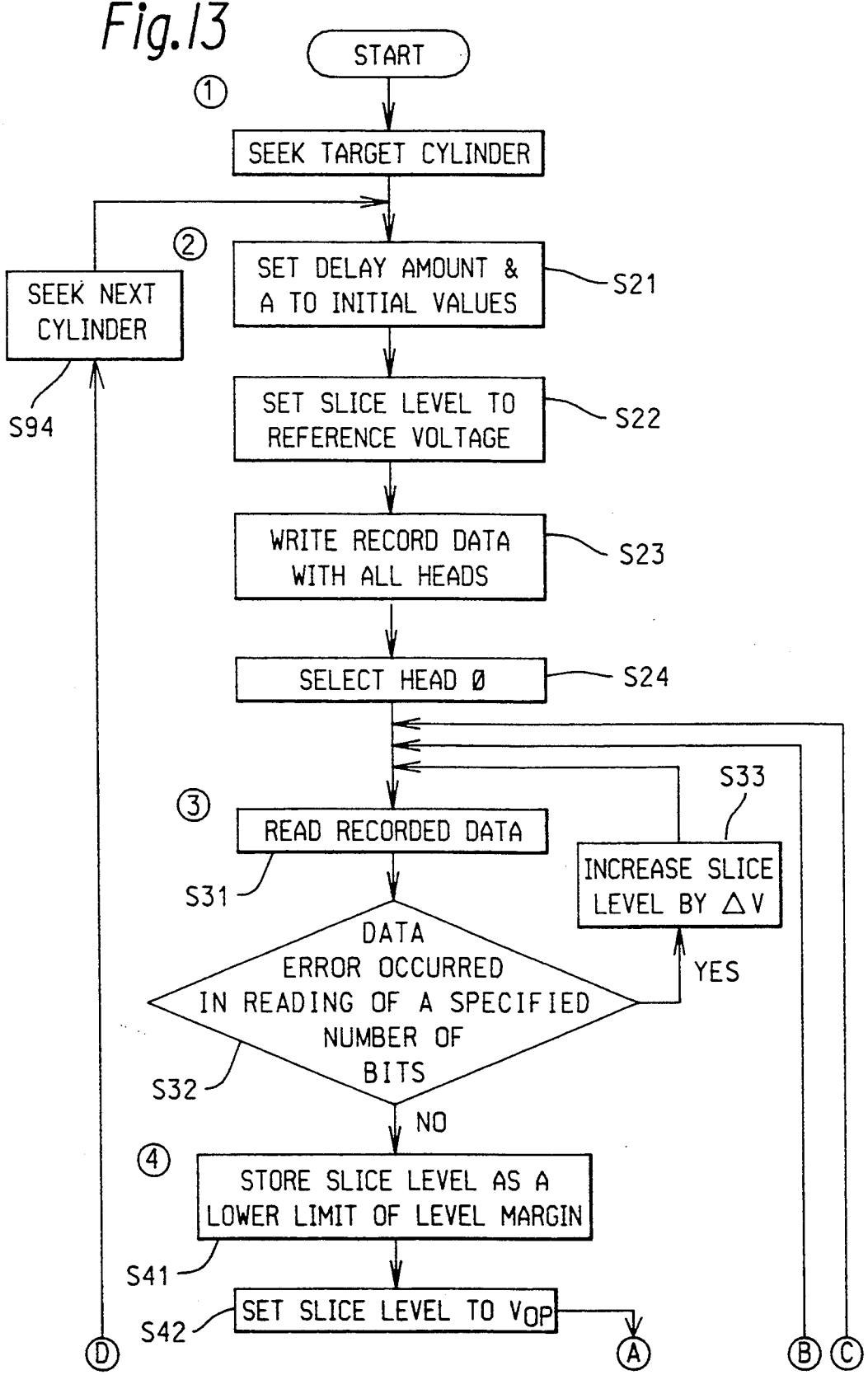
FIGS. 13 and 14 illustrate a flowchart for explaining the operation of FIG. 12.
Figure 14:
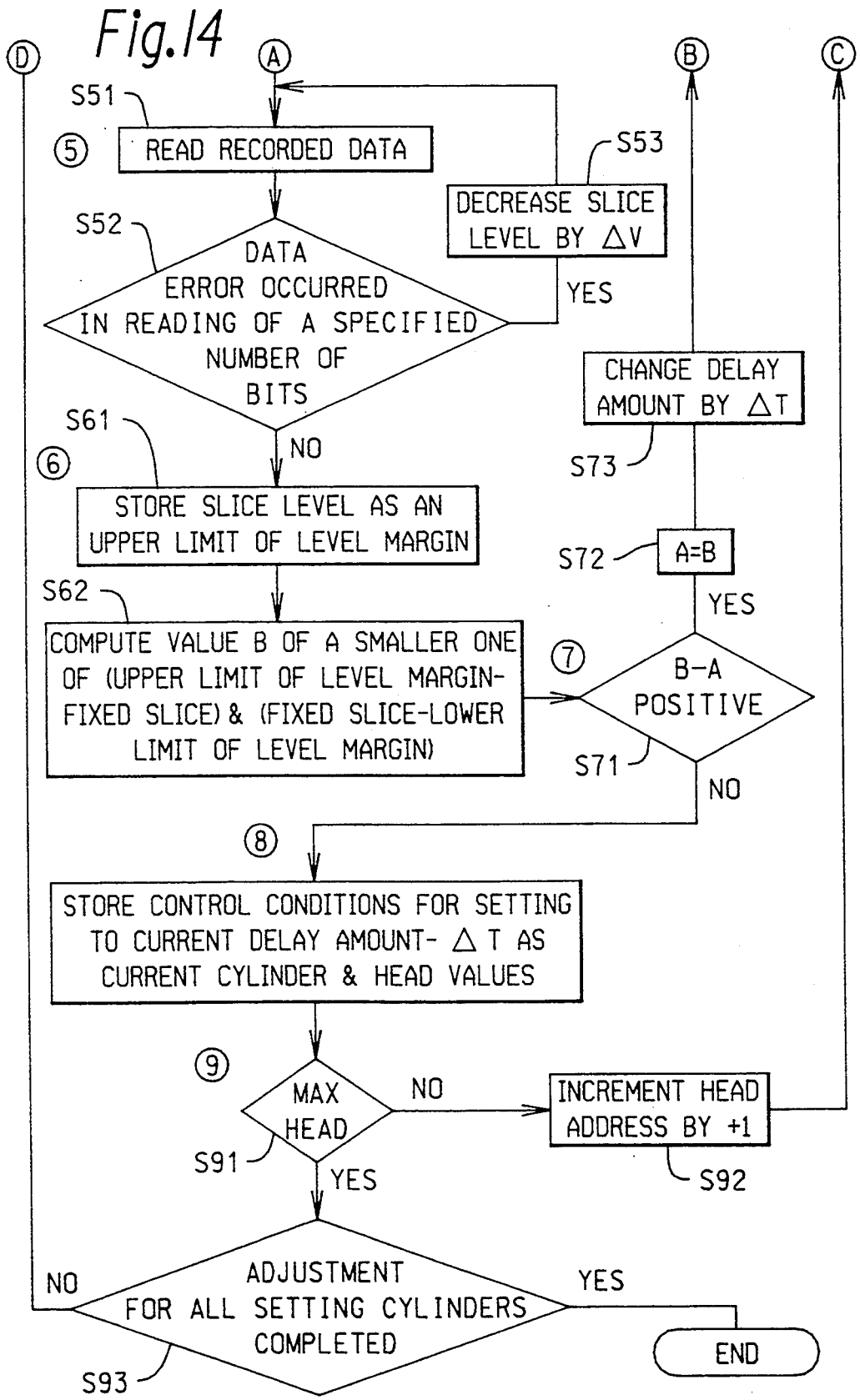

FIGS. 13 and 14 present processing flows (no. 1) and (no. 2) for determining the shift data for the delay amount in FIG. 12, and FIG. 15 is a diagram for explaining the operation.

(Step ①)

When the tester 50 is activated, the tester 50 instructs the main controller 20 to seek the target cylinder (e.g., the innermost zone 9 in FIGS. 9 and 10).

Accordingly, the main controller 20 controls the servo controller 21 to drive the voice coil motor 19 to position the thin-film magnetic head 1 to the target cylinder.

(Step ②)

Figure 15A:
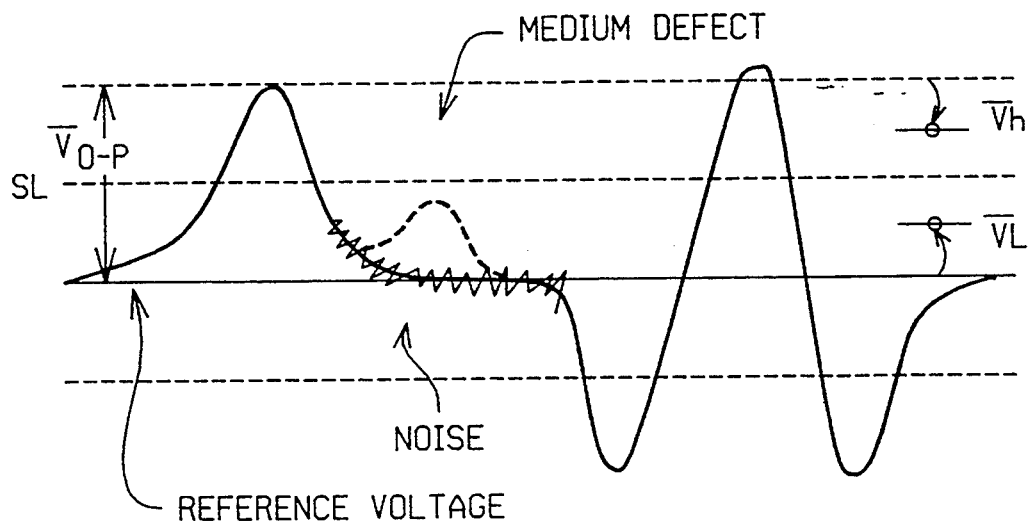
FIG. 15 is a diagram for explaining the operation of FIG. 12.

The tester 50 sets a delay amount T and a maximum measured value A to initial values ("0") (S21) and sets a slice level S to a reference voltage (see FIG. 15(A)) (S22) with respect to the main controller 20. The main controller 20 sets the slice level S in the level slicer 43 and the delay amount T in the register 80 of the delay amount determining circuit 8.

The tester 50 instructs the main controller 20 to write record data for all the heads (S23). The main controller 20 causes every thin-film magnetic head 1 to write the record data in the cylinder.

The tester 50 instructs the main controller 20 to select the head 0 first (S24), and the main controller 20 outputs the head 0 as a head address (HA) to the head selector 22 and the waveform equalizing circuit 9 (see FIG. 7).

(Step ③)

The main controller 20 controls the reading of recorded data (S31), and the tester 50 receives the presence/absence of an error in the readout data from the ECC circuit 49 through the route shown in FIG. 12 and determines if a data error has occurred in a specified number of bits of readout data (S32).

When there is a data error, the tester 50 instructs the main controller 20 to raise the slice level S by ΔV (S33), and the main controller 20 changes the slice level of the level slicer 43 accordingly and reads data again.

(Step ④)

When a data error is gone by increasing the reference voltage or the slice level, as it is the lower limit of the level margin as shown in FIG. 15(A), the tester 50 stores the slice level of that time as the lower limit VL of the level margin (S41).

Then, the tester 50 sets the slice level S of the main controller 20 to a maximum value Vop, and the main controller 20 sets it in the level slicer 43 (S42).

(Step ⑤)

Going to FIG. 14, the main controller 20 performs the reading of recorded data (S51), and the tester 50 receives the presence/absence of an error in the readout data from the ECC circuit 49 through the route shown in FIG. 12 and determines if a data error has occurred in a specified number of bits of readout data (S52).

When there is a data error, the tester 50 instructs the main controller 20 to decrease the slice level S by $\Delta V$ (S53), and the main controller 20 shifts the slice level of the level slicer 43 downward accordingly and reads data again.

(Step ⑥)

When a data error is gone by decreasing the slice level from the maximum voltage, as it is the upper limit of the level margin as shown in FIG. 15(A), the tester 50 stores the slice level of that time as the upper limit Vh of the level margin (S61).

Then, from a predetermined fixed slice SL, the upper limit Vh and the lower limit VL, the tester 50 computes (Vh−VL) and (SL−VL), compares them with each other, and uses a smaller level margin as a measured value B (S62).

Through this, the level margin for a given delay amount has been measured for a single thin-film magnetic head 1.

(Step ⑦)

The tester 50 compares the maximum measured value A with the measured value B to determine if (B−A) is positive (S71). If it is positive, which means B>A, the current measured value of the level margin is larger than the maximum measured value, so that the maximum measured value A is updated to the current measured value B (S72) and the instructed delay amount is changed by $\Delta T$ (S73). The main controller 20 is instructed to return to step ③ in FIG. 13 to measure the level margin with this delay amount.

(Step ⑧)

Figure 15B:
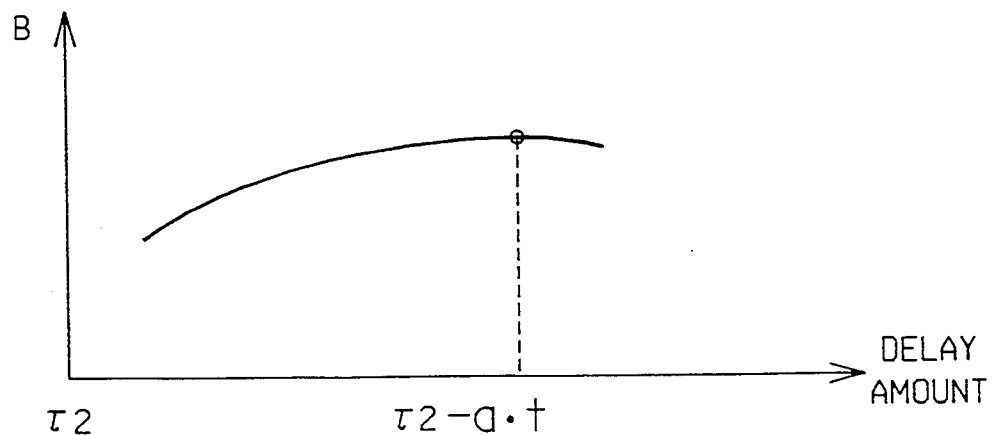

If the result of the comparison of the maximum measured value A with the measured value B shows that (B−A) is not positive, which means B≦A, the current measured value of the level margin is not greater than the maximum measured value, so that the tester 50 judges the maximum measured value A as the maximum value for the level margin as shown in FIG. 15(B), and stores the current delay amount −$\Delta T$ (i.e., the previous delay amount) as the optimal delay amount for the maximum level margin in the ROM 20a of the main controller 20 as the optimal delay control signal of that head.

(Step ⑨)

The tester 50 determines if the measured head is the maximum head (last measured head) (S91), and if it is not the maximum head, the tester 50 increments the head address by +1 (S92) and instructs the main controller 20 to set the delay amount and maximum measured value A back to the initial values. Further, after setting the slice level to the reference voltage, the tester returns to step ③ in FIG. 13 to measure the level margin of that head.

When the measured head is the maximum head, on the other hand, the tester 50 determines if the adjustment for all the setting cylinders is complete, and, if it is not completed yet, seeks the next setting cylinder (S94) and returns to step ② and, if the adjustment is complete, terminates the process (S93).

The delay control signal with the maximum level margin is measured for each thin-film magnetic head 1 and is stored in the ROM 20a of the main controller 20 in this manner.

It is therefore possible to automatically measure and control the optimal delay amount for each thin-film magnetic head 1, thus ensuring a reduction in the number of steps and improvement on the accuracy.

Although the optimal delay amount for the innermost zone 9 is measured here, the other zones can be properly selected by the zone address as described with reference to FIGS. 9 and 10.

Accordingly, the other setting cylinders following the process of S93 in step ⑨ is those of the zone 9, and an average of the delay amounts for the zone 9 is obtained. If necessary, therefore, the same measurement can be made for other than the zone 9.

Although the acquisition of the optimal delay amount for each thin-film magnetic head is executed using the tester 50 in the above-described embodiment, a processing program may be loaded into the main controller 20 to execute it.

While the optimal delay signal is stored in the ROM 20a, it may be stored as control information in an outer guard bunker on the data surface of a magnetic disk and may be read out and loaded into the register 80 when the apparatus is activated.

Further, although the cylinder position is converted into a zone address, the upper bits of the cylinder position may be used as a zone address.

(c) Description of Second Embodiment

Figure 16:
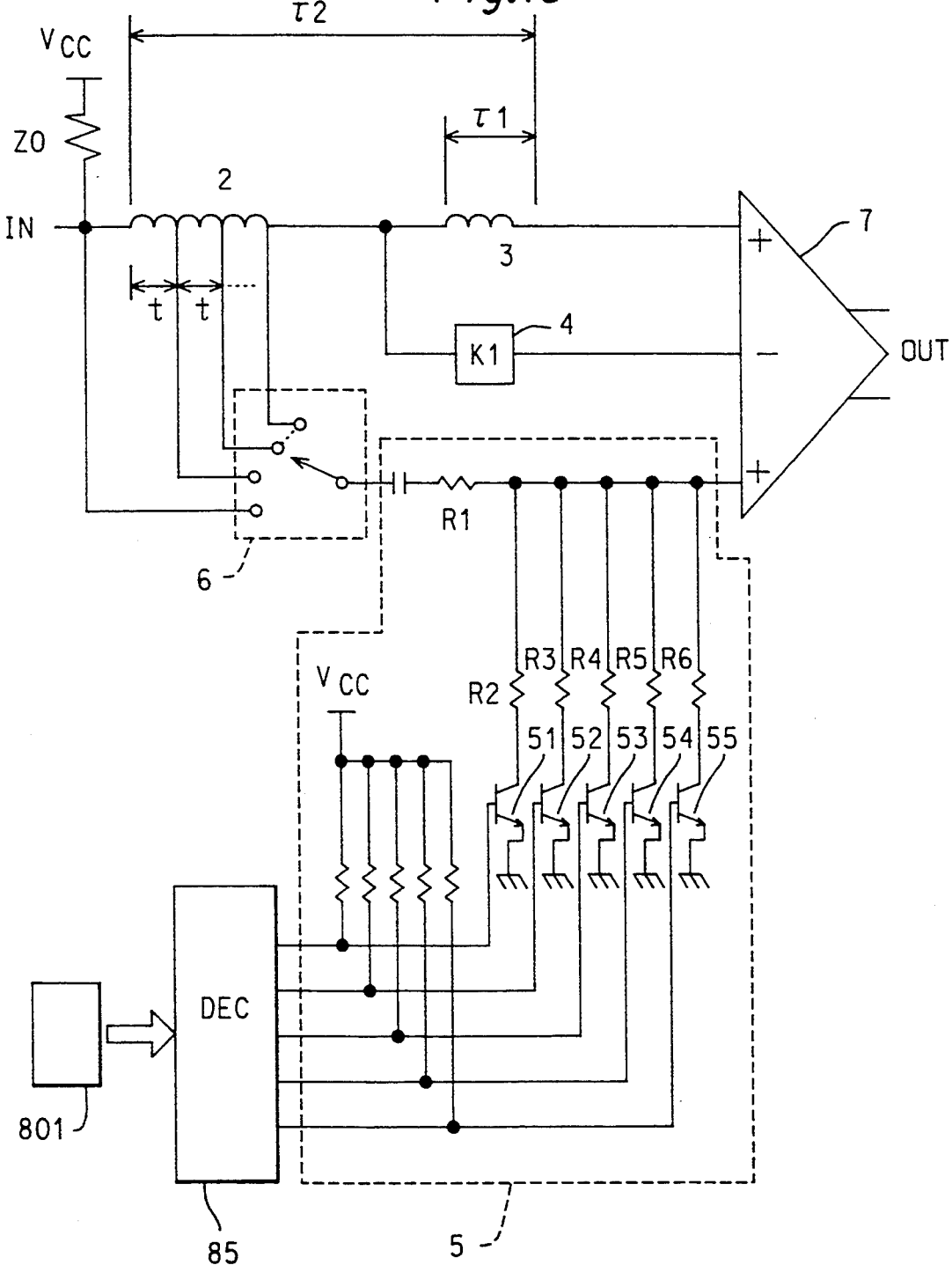
FIG. 16 is a block diagram showing the essential portions for explaining another embodiment of the present invention.

FIG. 16 is a block diagram of a second embodiment of the present invention.

The embodiment illustrated in FIG. 16 is characterized by the multiplier 5 and additional provision of a decoder 85 and a register 801, which control the multiplier. In FIG. 8, the multiplier 5 in the equalizer portion 901 is designed to multiply the output of the tap selector 6 by a fixed coefficient K2=V3/V1.

In other words, the multiplier 5 gives a fixed coefficient value to the tap selector 6 in FIG. 8. In the second embodiment shown in FIG. 16, however, the multiplying coefficient in the multiplier 5 can be selected more finely.

This can allow the control delay amount to be controlled more finely for the individual heads.

Figure 17:
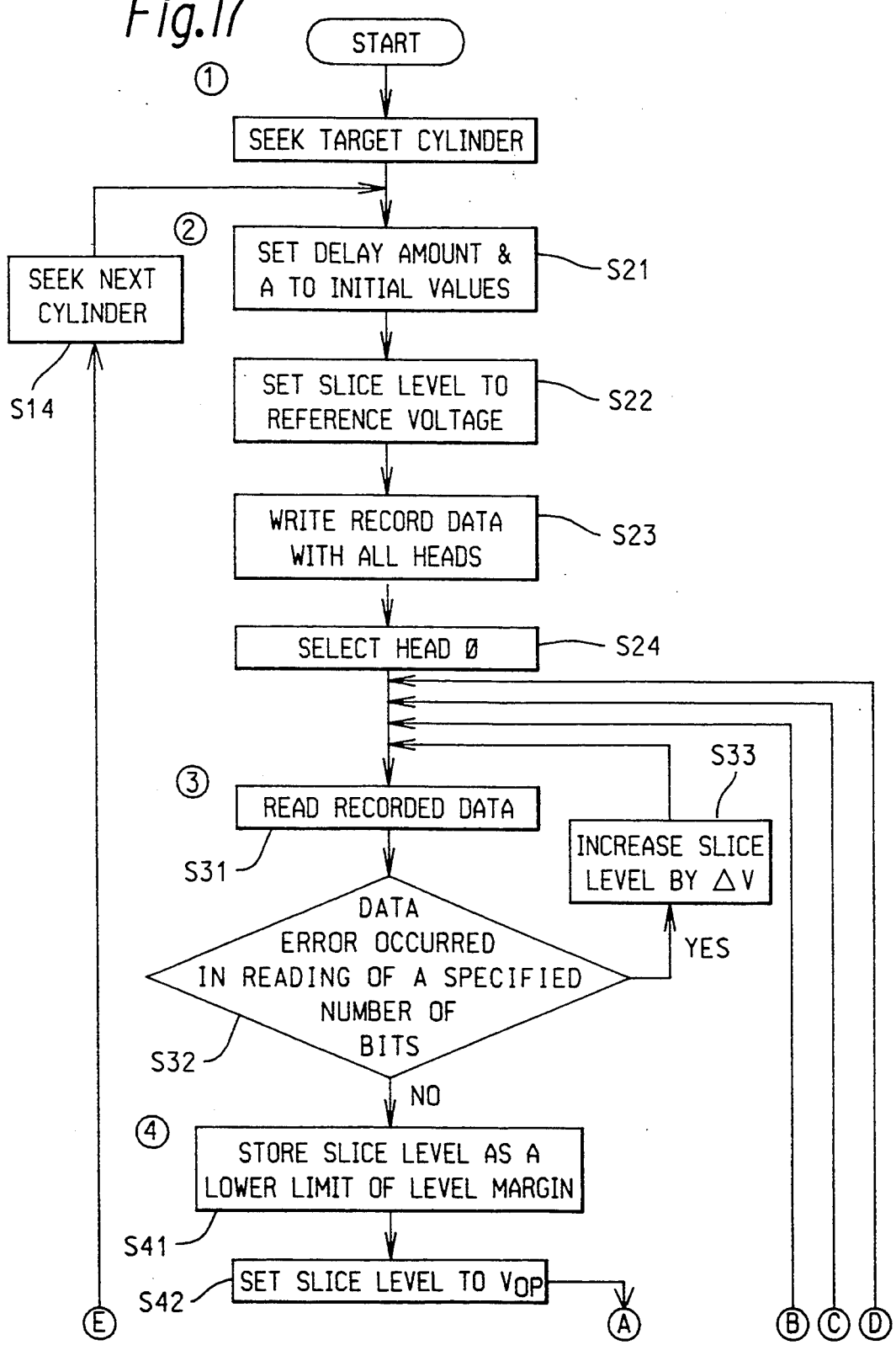
FIGS. 17 through 19 illustrate a flowchart for determining a control delay amount for each magnetic head and a coefficient K2 in the embodiment of FIG. 16.
Figure 18:
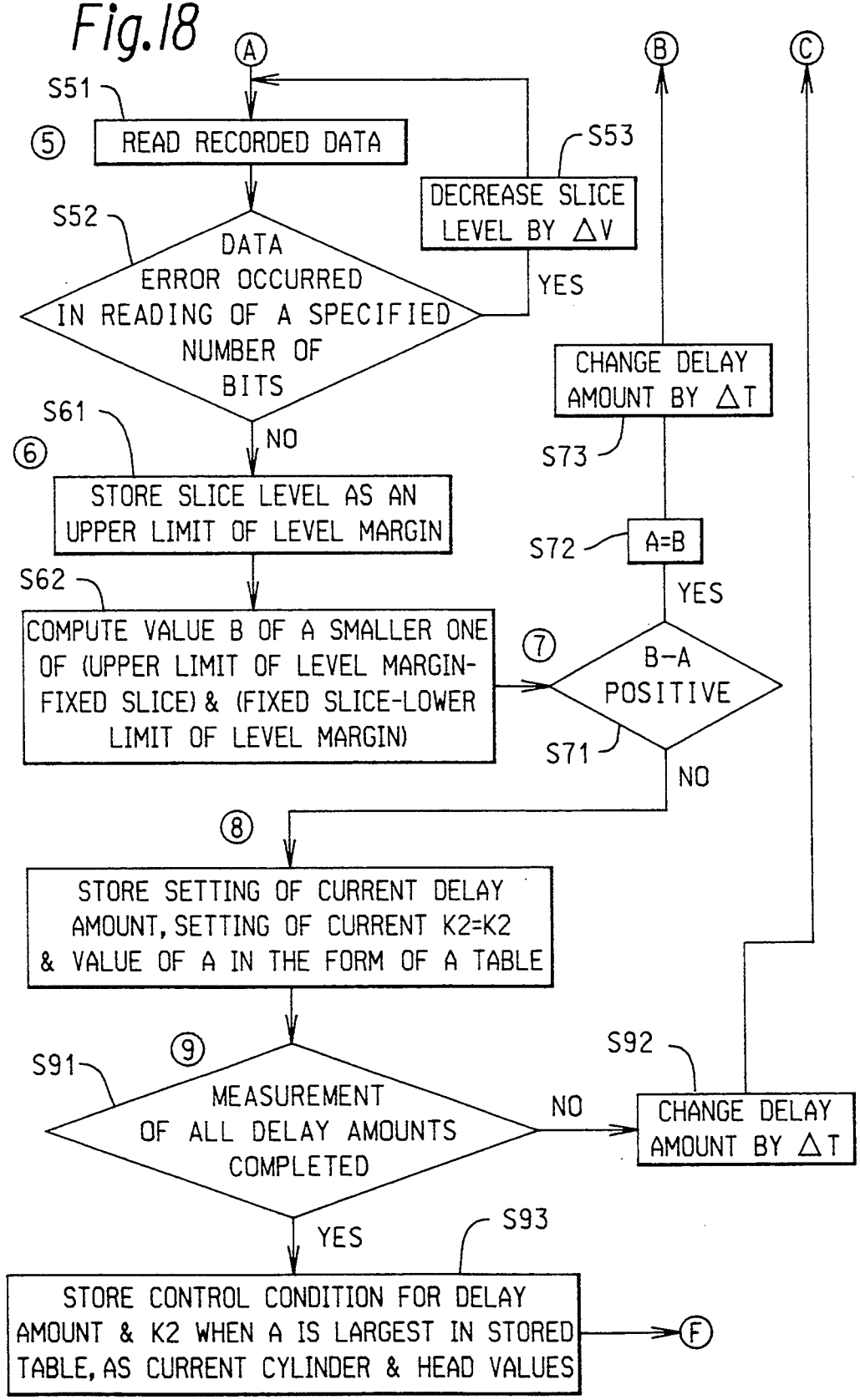
Figure 19:
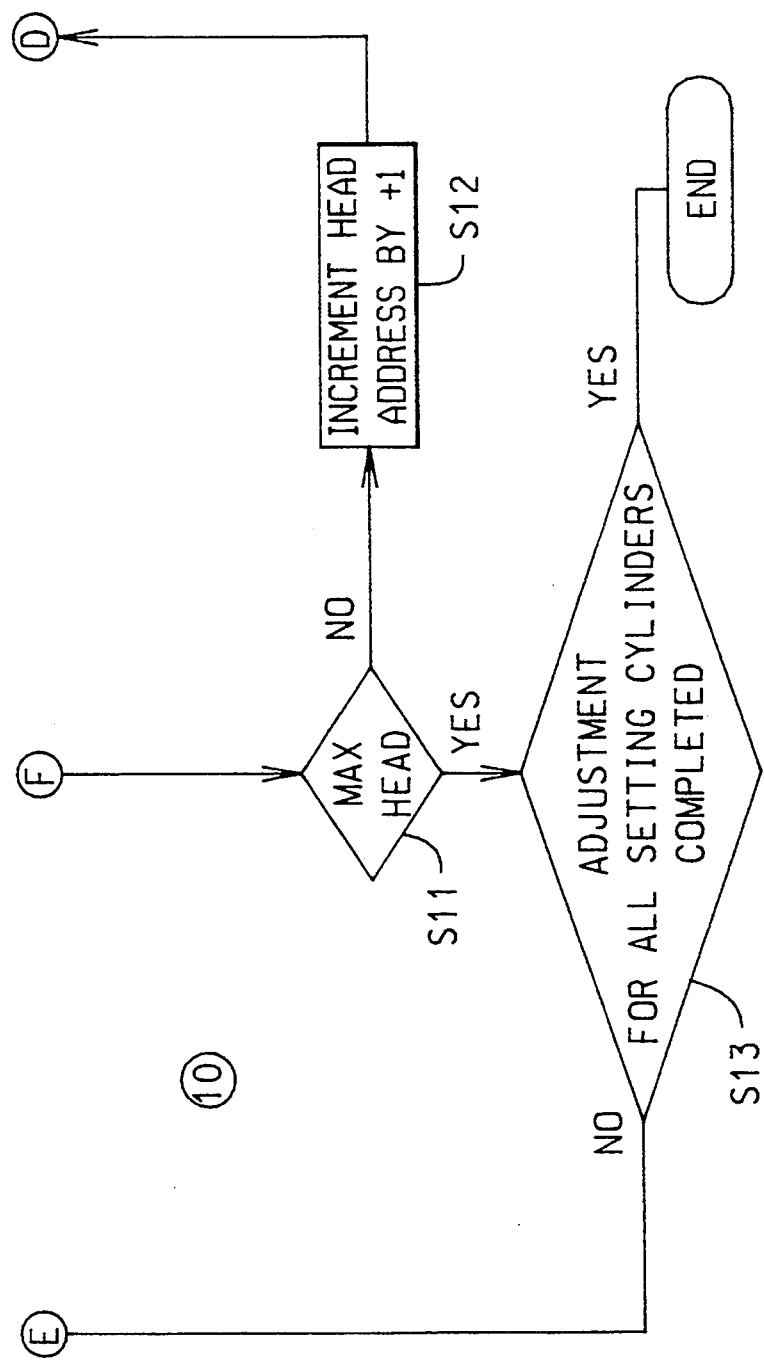

In FIG. 16, like or same reference numerals are used to denote parts identical or similar to those shown in FIG. 8. FIGS. 17 through 19 present a flow for explaining the production of control signals for the control operation in FIG. 16.

The output of the selector 6 is supplied to a resistor R1 in the multiplier 5 in FIG. 16, and the output of the resistor R1 is supplied to transistors 51 to 55 via collector resistors R2 to R6, respectively. The conduction and non-conduction of the transistors 51 to 55 are controlled by the output of the decoder 85.

One of the transistors 51 to 55 is rendered conductive by the output of the decoder 85. By arbitrarily selecting the collector resistors R2 to R6 of the transistors 51 to 55 and the resistor R1, therefore, the coefficient K2 of the multiplier 5 can take one of the following values.

$$K21 = R2/(R1 + R2) = K20$$
$$K22 = R3/(R1 + R3) = K20 + \Delta K$$
$$K23 = R4/(R1 + R4) = K22 + \Delta K$$
$$K24 = R5/(R1 + R5) = K23 + \Delta K$$
$$K25 = R6/(R1 + R6) = K24 + \Delta K$$

In this manner, it is possible to control the decoder 85 by the cylinder data set in the register 801 and select a predetermined coefficient based on the output of the decoder.

A method of determining the control delay amount and the coefficient K2 in the embodiment in FIG. 16 will be described referring to FIGS. 17 through 19.

FIGS. 17 through 19 illustrate a flow in association with the method of determining the delay amount (FIGS. 13 and 14) in the previous embodiment of FIG. 8.

(Step ①)

When the tester 50 is activated, the tester 50 instructs the main controller 20 to seek the target cylinder (e.g., the innermost zone 9 in FIGS. 9 and 10).

Accordingly, the main controller 20 controls the servo controller 21 to drive the voice coil motor 19 to position the thin-film magnetic head 1 to the target cylinder.

(Step ②)

The tester 50 sets a delay amount T, a coefficient K2 and a maximum measured value A as initial values ("0") (S21) and sets a slice level S to a reference voltage (see FIG. 15(A)) (S22) with respect to the main controller 20. The main controller 20 sets the slice level S in the level slicer 43 and the delay amount T in the register 80 of the delay amount determining circuit 8.

The tester 50 instructs the main controller 20 to write record data for all the heads (S23). The main controller 20 causes every thin-film magnetic head 1 to write the record data in the cylinder.

The tester 50 instructs the main controller 20 to select the head 0 first (S24), and the main controller 20 outputs the head 0 as a head address (HA) to the head selector 22 and the waveform equalizing circuit 9 (see FIG. 7).

(Step ③)

The main controller 20 controls the reading of recorded data (S31), and the tester 50 receives the presence/absence of an error in the readout data from the ECC circuit 49 through the route shown in FIG. 12 and determines if a data error r has occurred in a specified number of bits of readout data (S32).

When there is a data error, the tester 50 instructs the main controller 20 to raise the slice level S by $\Delta V$ (S33), and the main controller 20 changes the slice level of the level slicer 43 accordingly and reads data again.

(Step ④)

When a data error is gone by increasing the reference voltage or the slice level, as it is the lower limit of the level margin as shown in FIG. 15(A), the tester 50 stores the slice level of that time as the lower limit VL of the level margin (S41).

Then, the tester 50 sets the slice level S of the main controller 20 to a maximum value Vop, and the main controller 20 sets it in the level slicer 43 (S42).

(Step ⑤)

Going to FIG. 8, the main controller 20 performs the reading of recorded data (S51), and the tester 50 receives the presence/absence of an error in the readout data from the ECC circuit 49 through the route shown in FIG. 12 and determines if a data error has occurred in a specified number of bits of readout data (S52).

When there is a data error, the tester 50 instructs the main controller 20 to decrease the slice level S by $\Delta V$ (S53), and the main controller 20 shifts the slice level of the level slicer 43 downward accordingly and reads data again.

(Step ⑥)

When a data error is gone by decreasing the slice level from the maximum voltage, as it is the upper limit of the level margin as shown in FIG. 15(A), the tester 50 stores the slice level of that time as the upper limit Vh of the level margin (S61).

Then, from a predetermined fixed slice SL, the upper limit Vh and the lower limit VL, the tester 50 computes (Vh−SL) and (SL−VL), compares them with each other, and uses a smaller level margin as a measured value B (S62).

Through this, the level margin for a given delay amount and the coefficient K2 has been measured for a single thin-film magnetic head 1.

(Step ⑦)

The tester 50 compares the maximum measured value A with the measured value B to determine if (B−A) is positive (S71). If it is positive, which means B>A, the current measured value of the level margin is larger than the maximum measured value, so that the maximum measured value A is updated to the current measured value B (S72) and the instructed coefficient K2 is changed by $\Delta K2$ (S73). The main controller 20 is instructed to return to step 3 in FIG. 17 to measure the level margin with this new coefficient.

(Step ⑧)

If the result of the comparison of the maximum measured value A with the measured value B shows that (B−A) is not positive, which means B≦A, the current measured value of the level margin is not greater than the maximum measured value. The tester 50 judges the maximum measured value A as the maximum value for the level margin as shown in FIG. 15(B), and stores the current coefficient (K2−$\Delta K2$) (i.e., the previous coefficient) as the optimal coefficient for the maximum level margin in the ROM 20a of the main controller 20 as the optimal coefficient control signal of that head.

(Step ⑨)

It is determined if the measurement of all the delay amounts for a single head (i.e., the measurement with all the taps of the tap selector 6 switched) is complete (S91).

If the measurement of all the delay amounts is not completed, the delay amount is changed by $\Delta T$ (92). Then, the flow returns again to step 3 to resume the process. When the measurement of all the delay amounts is completed, the control conditions (CLY1-M-CLY4M and SFT1, SFT2 and SFT4) for the delay amount and the coefficient K2 for the largest A from the data, stored in the form of a table in step ⑧, are stored as the optimal control values for the current cylinder and head (S93).

(Step 10 )

The tester 50 determines if the measured head is the maximum head (last measured head) (S11), and if it is not the maximum head, the tester 50 increments the head address by +1 (S12) and instructs the main controller 20 to set the delay amount, the coefficient K2 and the maximum measured value A back to the initial values. Further, after setting the slice level to the reference voltage, the tester returns to step 3 in FIG. 17 to measure the level margin of that head.

When the measured head is the maximum head, on the other hand, the tester 50 determines if the adjustment for all the setting cylinders is complete, and, if it is not completed yet, seeks the next setting cylinder (S14) and returns to step②, and, if the adjustment is complete, terminates the process (S13).

The delay control signal and the coefficient K2 of the multiplier 5 for the maximum level margin is measured for each thin-film magnetic head 1, and are stored in the ROM 21a of the main controller 20 in this manner.

Those stored data are used to control the tap selector 6 and multiplier 5 through the decoders 84 and 85 as already explained.

Although the present invention has been described with reference to the embodiments, this invention is not limited to those, and it should of course be understood that those which are in substantially the same scope as the concept of this invention are to fall within the protective scope of this invention.

Industrial Applicability

The present invention can effectively eliminate a negative edge which brings about a problem when a thin-film magnetic head is used in a magnetic disk apparatus.

Therefore, the present invention facilitates the use of thin-film magnetic heads to meet a future demand for higher recording density and higher operation speed of a magnetic disk apparatus, and will make great industrial contribution.

I claim:

1. A reproduced waveform equaling circuit for thin-film magnetic heads comprising:
    a delay circuit for delaying a readout signal, read by a thin-film magnetic head selected by a head select signal, by a predetermined time;
    a delay amount changing circuit for giving said readout signal a delay time shorter than a delay time given by said delay circuit;
    an operation circuit, connected to said delay circuit and said delay amount changing circuit, for outputting a waveform-equalized signal acquired by eliminating a negative edge of said readout signal from a first delay signal delayed by said predetermined time and a second delay signal delayed by a time shorter than said predetermined time; and
    a delay amount determining circuit for determining a delay time given by said delay amount changing circuit from both said head select signal and a head position signal of said thin-film magnetic head,
    a delay amount of said delay amount changing circuit being controlled by a delay amount indicating signal from said delay amount determining circuit.

2. The reproduced waveform equalizing circuit according to claim 1, wherein said delay amount 3. The reproduced waveform equalizing circuit according to claim 1, wherein said delay amount determining circuit has a delay amount storing section for storing a delay amount indicating signal corresponding to said head position signal and said head select signal.

4. The reproduced waveform equalizing circuit according to claim 3, wherein said delay amount storing section includes a storage section for storing a shift amount for each thin-film magnetic head, an adder for adding said shift amount of the associated thin-film magnetic head in said storage section and said head position signal, and a decoder for decoding an output of said adder.

5. The reproduced waveform equalizing circuit according to claim 1, wherein said head position signal is a zone address to which a head position track belongs.

6. (amended) The reproduced waveform equalizing circuit according to claim 1, wherein said operation circuit has an adder-subtracter for subtracting an output of a multiplier connected to said delay circuit from an output of said delay circuit and further adding an output of said delay amount changing circuit thereto.

7. A reproduced waveform equalizing circuit for thin-film magnetic heads comprising:
    a first delay circuit with a plurality of tap outputs for delaying a readout signal read by a thin-film magnetic head selected by a head select signal by a time $(\tau_2 - \tau_1)$; a second delay circuit for further delaying an output of said first delay circuit by a time $\tau_1$ $\tau1$;
    a first multiplier for multiplying said output of said first delay circuit by K1;
    a tap selector for selecting one of a plurality of taps of said first delay circuit;
    a second multiplier for multiplying an output from said tap selected by said tap selector by K2;
    an adder-subtracter for subtracting an output of said first multiplier from said output of said second delay circuit and further adding an output of said second multiplier thereto; and
    a delay amount determining circuit for determining the tap which is to be selected by said tap selector from both said head select signal and a head position signal of said thin-film magnetic head.

8. The reproduced waveform equalizing circuit according to claim 1, wherein said delay circuit has an input end terminated with a characteristic impedance $Z_0$ and an output end having an emitter follower arrangement.

9. The reproduced waveform equalizing circuit according to claim 3, further comprising a level slice circuit for slicing an output signal of said operation circuit at a predetermined level,
    wherein it is determined if there is an error in a read reproduction signal by changing said slice level, a slice level limit in a set delay amount indicating signal to cause an error in said readout reproduction signal is measured, and the delay amount indicating signal which gives a largest margin to said slice level limit is stored as an optimal value in said delay amount storing section.

10. The reproduced waveform equalizing circuit according to claim 9, wherein the delay amount indicating signal which provides a largest difference between said slice level limit and a fixed slice level (SL) is an optimal value.

11. The reproduced waveform equalizing circuit according to claim 7, wherein a multiple K2 of said second multiplier is variable and a size of said multiple K2 is controlled by a multiple indicating signal from said delay amount determining circuit.

12. The reproduced waveform equalizing circuit according to claim 11, wherein said second multiplier has a resistor R1 connected in series to said output of said delay amount changing circuit and resistors (R2–R6) connected in parallel to said resistor R1 and respectively connected to collectors of a plurality of transistors, and conduction/non-conduction of said plurality of transistors is controlled by said multiple indicating signal from said delay amount determining circuit.

13. The reproduced waveform equalizing circuit according to claim 11, wherein said delay amount determining circuit has a delay amount storing section for storing a delay amount indicating signal corresponding to said head position signal and said head select signal, and a multiple storing section for storing said multiple indicating signal.

14. The reproduced waveform equalizing circuit according to claim 13, further comprising a level slice circuit for slicing an output of said adder-subtracter at a predetermined level,
   wherein it is determined if there is an error in a read reproduction signal by changing said slice level, a slice level limit in set delay amount indicating signal and multiple indicating signal to cause an error in said readout reproduction signal is measured, and the delay amount indicating signal and multiple indicating signal which give a largest margin to slice level limit are stored as optimal values in said delay amount storing section and said multiple storing section, respectively.

15. The reproduced waveform equalizing circuit according to claim 14, wherein the delay amount indicating signal and multiple indicating signal which provide a largest difference between said slice level limit and a fixed slice level (SL) are optimal values.

* * * * *

UNITED STATES PATENT AND TRADEMARK OFFICE
CERTIFICATE OF CORRECTION

PATENT NO. : 5,440,434  
DATED : August 8, 1995  
INVENTOR(S) : Masahide Kanegae Page 1 of 2

It is certified that error appears in the above-indentified patent and that said Letters Patent is hereby corrected as shown below:

Column 3, line 8, delete "aims".

Column 3, line 24, insert --of-- between "signal" and "the".

Column 3, line 40, delete "hoad" and insert --head--.

Column 4, line 67, delete "Ckiser ti tge iytusde" and insert -- Closer to the outside--.

Column 6, line 49, insert --5-- between "multiplexer" and "in".

Column 7, line 63, delete " . " after "individual".

Column 8, line 44, delete "$" and insert --S--.

Column 9, line 24, delete "BFT" and insert --SFT--.

Column 9, line 67, delete "phaseo locked" and insert --phase-locked--.

Column 13, line 36, delete "(Step ⑧)" and insert --(Step ③)--.

Column 13, line 49, delete "(Step ⑨)" and insert --(Step ④)--.

Column 15, line 34, delete "equaling" and insert --equalizing--.

UNITED STATES PATENT AND TRADEMARK OFFICE
CERTIFICATE OF CORRECTION

PATENT NO. : 5,440,434
DATED : August 8, 1995
INVENTOR(S) : Masahide Kanegae

It is certified that error appears in the above-indentified patent and that said Letters Patent is hereby corrected as shown below:

Column 15, line 57, after "amount" insert --determining circuit selectively outputs a signal from one of a plurality of taps from said delay circuit.--.

Column 16, line 18, delete "$\tau 1$".

In The Abstract: Lines 12 and 13

Delete "$(\tau 2-\tau 1)$" and insert --$\tau 2$--.

Delete "(J2-J1)" and insert --$\tau 2-\tau 1$--.

Insert a hyphen "-" between "$\tau 2-\tau 1$" and "delayed".

Signed and Sealed this

Twenty-fourth Day of September, 1996

Attest:

BRUCE LEHMAN

Attesting Officer

Commissioner of Patents and Trademarks